(12) United States Patent
Ohbitsu

(10) Patent No.: US 10,243,940 B2
(45) Date of Patent: Mar. 26, 2019

(54) INFORMATION MANAGEMENT APPARATUS, INFORMATION MANAGEMENT SYSTEM, INFORMATION MANAGEMENT METHOD, AND STORAGE MEDIUM

(71) Applicant: FUJITSU CLIENT COMPUTING LIMITED, Kawasaki-shi, Kanagawa (JP)

(72) Inventor: Toshiro Ohbitsu, Akishima (JP)

(73) Assignee: Fujitsu Client Computing Limited (JP)

( * ) Notice: Subject to any disclaimer, the term of this patent is extended or adjusted under 35 U.S.C. 154(b) by 15 days.

(21) Appl. No.: 14/828,619

(22) Filed: Aug. 18, 2015

(65) Prior Publication Data

US 2015/0358307 A1 Dec. 10, 2015

Related U.S. Application Data

(63) Continuation of application No. PCT/JP2013/059313, filed on Mar. 28, 2013.

(51) Int. Cl.
*H04L 29/00* (2006.01)
*H04L 29/06* (2006.01)
*G06F 21/31* (2013.01)
*G06Q 10/10* (2012.01)
*H04W 12/06* (2009.01)

(52) U.S. Cl.
CPC .............. *H04L 63/08* (2013.01); *G06F 21/31* (2013.01); *G06Q 10/10* (2013.01); *H04L 67/40* (2013.01); *H04W 12/06* (2013.01)

(58) Field of Classification Search
CPC .................................. G06F 21/00; H04L 63/08

USPC ............................................................ 726/5
See application file for complete search history.

(56) References Cited

U.S. PATENT DOCUMENTS 8,272,050 B2 * 9/2012 Kotani .................. G06F 21/32
713/189
2011/0081634 A1 4/2011 Kurata et al.
(Continued)

FOREIGN PATENT DOCUMENTS

JP 2002-304502 10/2002
JP 2004-302637 10/2004
JP 2004-310207 11/2004
(Continued)

OTHER PUBLICATIONS

International Search Report, mailed in connection with PCT/JP2013/059313 dated Jul. 2, 2013.

*Primary Examiner* — Anthony D Brown
*Assistant Examiner* — Michael D Anderson
(74) *Attorney, Agent, or Firm* — Harness, Dickey & Pierce, P.L.C.

(57) ABSTRACT

An information management apparatus includes a memory and a processor configured to execute a process. The process includes registering schedule information entered by a user, storing the registered schedule information in the memory, obtaining current environmental information from a mobile terminal of the user, and when the registered schedule information is changed, determining whether the user of the mobile terminal is a genuine user based on the current environmental information and past environmental information obtained from past schedule information stored in the memory.

5 Claims, 18 Drawing Sheets

(56) References Cited

U.S. PATENT DOCUMENTS

2012/0303961 A1* 11/2012 Kean .................. H04L 9/3234
                                                          713/171
2014/0007227 A1   1/2014 Morinaga et al.

FOREIGN PATENT DOCUMENTS

| | | |
|---|---|---|
| JP | 2006-352561 | 12/2006 |
| JP | 2007-133521 | 5/2007 |
| JP | 2007-306179 | 11/2007 |
| JP | 2009-301440 | 12/2009 |
| JP | 2011-081431 | 4/2011 |
| JP | 2011-170810 | 9/2011 |
| WO | 2012/124383 | 9/2012 |

* cited by examiner

FIG.7

| USAGE NUMBER | SCHEDULE REGISTRATION | PC ID | MOBILE TERMINAL ID | USER ID | PASSWORD |
|---|---|---|---|---|---|
| 1234567890 | 2012/01/01 | 00-00-00-00-11-11 | 0000000011111111 | ab@ab.com | ABCD |
| 2345678901 | 2012/01/02 | 00-00-00-00-22-22 | 0000000022222222 | ef@ef.com | EFCD |
| 3456789012 | 2012/01/03 | 00-00-00-00-33-33 | 0000000033333333 | ig@ig.com | IGCD |

FIG.8

| USAGE NUMBER | ACTION INFORMATION | TIME INFORMATION (HOUR:MINUTE) | LOCATION INFORMATION (DEGREES) | ORIENTATION INFORMATION (DEGREES) | PEDOMETER INFORMATION (STEPS) | SOUND LEVEL INFORMATION (dB) |
|---|---|---|---|---|---|---|
| 11111111 | HOME | 08:00 | LATITUDE 035.40 / LONGITUDE 139.45 | — | — | — |
| 11111111 | STATION A | 08:10 | LATITUDE 035.45 / LONGITUDE 139.42 | — | — | — |
| 11111111 | STATION B | 08:20 | LATITUDE 035.41 / LONGITUDE 139.41 | — | — | — |
| 11111111 | COMPANY C | 08:30 | LATITUDE 035.40 / LONGITUDE 139.40 | — | — | — |
| 11111111 | — | — | — | — | — | — |
| 11111111 | IN CAR 1 | 12:30 | LATITUDE 035.35 / LONGITUDE 139.42 | — | — | — |
| 11111111 | D CITY, E STREET | 13:00 | LATITUDE 035.34 / LONGITUDE 139.47 | — | — | — |
| 11111111 | COMPANY G | 13:10 | LATITUDE 035.36 / LONGITUDE 139.48 | — | — | — |
| 11111111 | — | — | — | — | — | — |
| 11111111 | STATION H | 15:00 | LATITUDE 035.36 / LONGITUDE 139.46 | — | — | — |

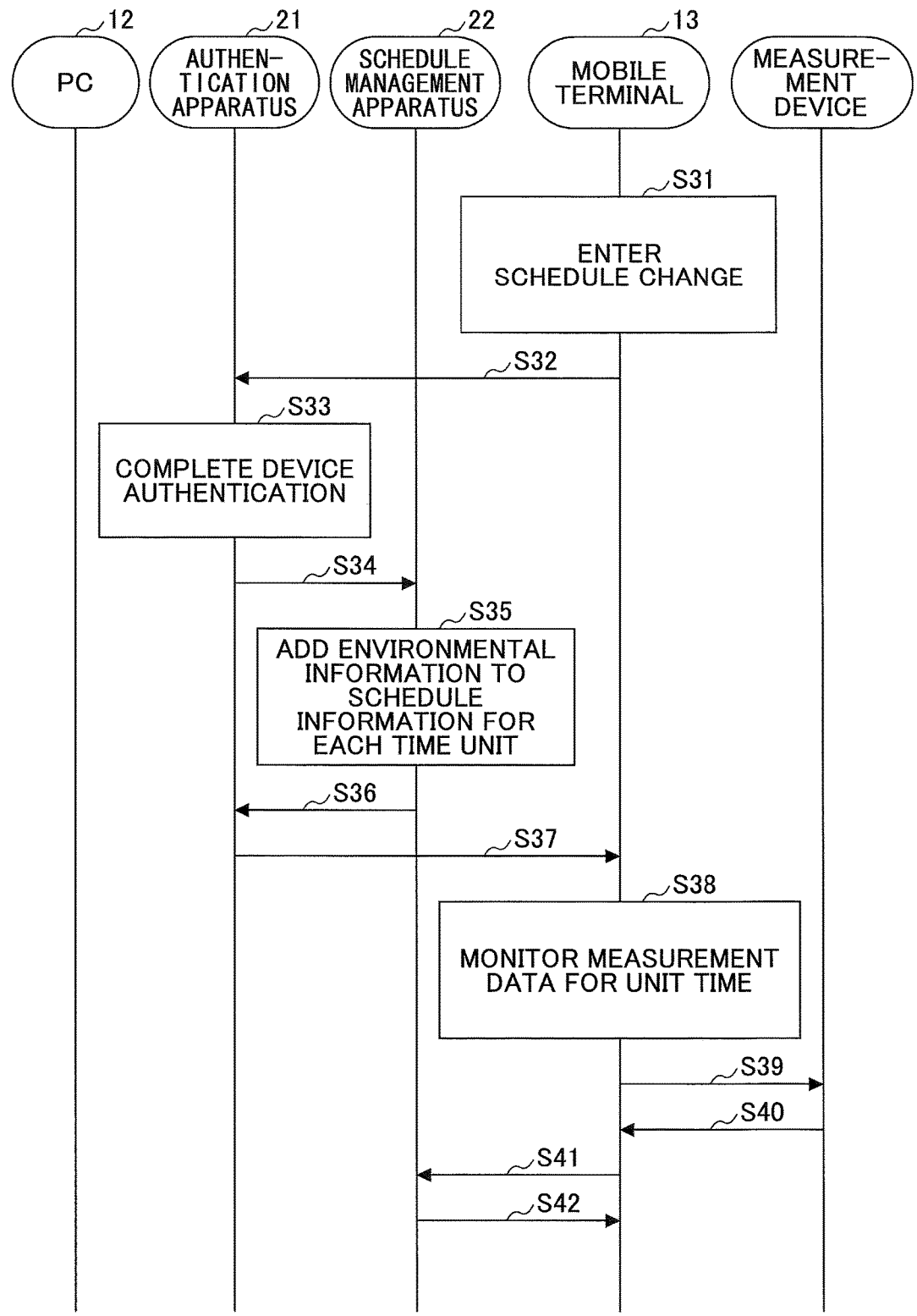

FIG.11

| USAGE NUMBER | ACTION INFORMATION | TIME INFORMATION (HOUR:MINUTE) | LOCATION INFORMATION (DEGREES) | ORIENTATION INFORMATION (DEGREES) | PEDOMETER INFORMATION (STEPS) | SOUND LEVEL INFORMATION (dB) |
|---|---|---|---|---|---|---|
| 11111111 | HOME | 08:00 | LATITUDE 035.40 / LONGITUDE 139.45 | — | — | — |
| 11111111 | STATION A | 08:10 | LATITUDE 035.45 / LONGITUDE 139.42 | — | — | — |
| 11111111 | STATION B | 08:20 | LATITUDE 035.41 / LONGITUDE 139.41 | — | — | — |
| 11111111 | COMPANY C | 08:30 | LATITUDE 035.41 / LONGITUDE 139.40 | 270.00 | 1000 | 30.00 |
| 11111111 | STATION B | 08:40 | LATITUDE 035.41 / LONGITUDE 139.41 | 60.00 | 2000 | 85.00 |
| 11111111 | STATION J | 08:50 | LATITUDE 035.44 / LONGITUDE 139.47 | 47.00 | 2200 | 85.00 |
| 11111111 | STATION K | 09:00 | LATITUDE 035.45 / LONGITUDE 139.44 | 50.00 | 2500 | 80.00 |
| 11111111 | COMPANY L | 09:10 | LATITUDE 035.45 / LONGITUDE 139.43 | 80.00 | 3500 | 40.00 |
| 11111111 | — | — | — | — | — | — |

FIG.12A

| TIME INFORMATION 09:00 | 2011/11/20 | 2011/12/15 | 2012/01/10 | 2012/01/15 | 2012/01/20 |
|---|---|---|---|---|---|
| LOCATION INFORMATION (LATITUDE/LONGITUDE) | 035.39 / 139.38 | 035.45 / 139.44 | 034.69 / 134.93 | 035.26 / 139.38 | 034.69 / 134.92 |
| ORIENTATION INFORMATION (DEGREES) | 51.00 | 52.00 | 270.00 | 50.00 | 200.00 |
| PEDOMETER INFORMATION (STEPS) | 2500 | 2600 | 5000 | 2800 | 4100 |
| SOUND LEVEL INFORMATION (dB) | 82.00 | 85.00 | 80.00 | 88.00 | 30.00 |

FIG.12B

| TIME INFORMATION 09:00 | TOLERANCE | PROBABILITY LEVEL | REFERENCE VALUE | MEASUREMENT VALUE |
|---|---|---|---|---|
| LOCATION INFORMATION | LATITUDE ±0.1 / LONGITUDE ±0.1 | 100 | LATITUDE 035.45 / LONGITUDE 139.44 | LATITUDE 035.44 / LONGITUDE 139.44 |
| ORIENTATION INFORMATION (DEGREES) | ±10 | 10 | 60.00 | 58.00 |
| PEDOMETER INFORMATION (STEPS) | ±200 | 3 | 2500 | 2650 |
| SOUND LEVEL INFORMATION (dB) | ±15.00 | 1 | 80.00 | 70.00 |

FIG.14

| REGISTERED MOBILE TERMINAL | AA-11A |

REGISTERED SCHEDULE INFORMATION   20120101

CHANGE INFORMATION

DEPARTURE PLACE   COMPANY C   SCHEDULED DEPARTURE TIME  08:30

DESTINATION        COMPANY L   SCHEDULED ARRIVAL TIME  NORMAL

OTHER ACTIONS IN ROUTE         NONE

CHANGE INFORMATION

DEPARTURE PLACE   COMPANY L   NORMAL

SUBSEQUENT SCHEDULE   ENTERED AFTER ARRIVING COMPANY L

OK

INFORMATION MANAGEMENT APPARATUS, INFORMATION MANAGEMENT SYSTEM, INFORMATION MANAGEMENT METHOD, AND STORAGE MEDIUM

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2013/059313, filed on Mar. 28, 2013, the entire contents of which are incorporated herein by reference.

FIELD

An aspect of this disclosure relates to an information management apparatus, an information management system, an information management method, and a storage medium.

BACKGROUND

There exists a technology that enables a mobile terminal carried out of, for example, an office to access a personal computer (PC) via a communication network such as the Internet. To connect to the PC, the mobile terminal needs to be authenticated by an authentication server on the communication network. When successfully authenticated by the authentication server, the mobile terminal can connect to the PC, and send and receive data to and from the PC via the authentication server.

The authentication may be performed, for example, based on an ID and a password entered by a user via the mobile terminal or based on action information of the user of the mobile terminal. When the ID and the password or the action information is valid, the mobile terminal is allowed to connect to the PC. There also exists a technology where location information of mobile terminals is obtained to accumulate action information of users, and information on destinations and estimated arrival times of the users is generated based on movement directions and movement distances of the users (see, for example, Japanese Laid-Open Patent Publication No. 2009-301440 and Japanese Laid-Open Patent Publication No. 2004-302637).

SUMMARY

According to an aspect of this disclosure, there is provided an information management apparatus including a memory and a processor configured to execute a process. The process includes registering schedule information entered by a user, storing the registered schedule information in the memory, obtaining current environmental information from a mobile terminal of the user, and when the registered schedule information is changed, determining whether the user of the mobile terminal is a genuine user based on the current environmental information and past environmental information obtained from past schedule information stored in the memory.

BRIEF DESCRIPTION OF DRAWINGS

FIG. 7 is a table illustrating an example of initial registration information;

FIG. 8 is a table illustrating an example of schedule information;

FIG. 9 is a sequence chart illustrating an exemplary schedule changing process;

FIG. 11 is a table illustrating an example of changed schedule information;

FIG. 12A is a table illustrating an example of environmental information;

FIG. 12B is a table illustrating an example of probability criteria;

FIG. 14 is a drawing illustrating an exemplary change screen;

DESCRIPTION OF EMBODIMENTS

With the related-art technologies described above, it is necessary to register information such as user identification information or biometric information and schedule information (time and location) of users of mobile terminals in the authentication server in advance. Also with the related-art technologies, when the location of a user at a time is different from that in the registered schedule information, the authentication of the user fails. In other words, a user is not successfully authenticated unless the user acts according to the schedule information registered in advance.

An aspect of this disclosure provides an information management apparatus, an information management system, an information management method, and a storage medium that make it possible to reduce the burden of the user in information management.

Preferred embodiments are described below with reference to the accompanying drawings.

<Information Management System>

Figure 1:
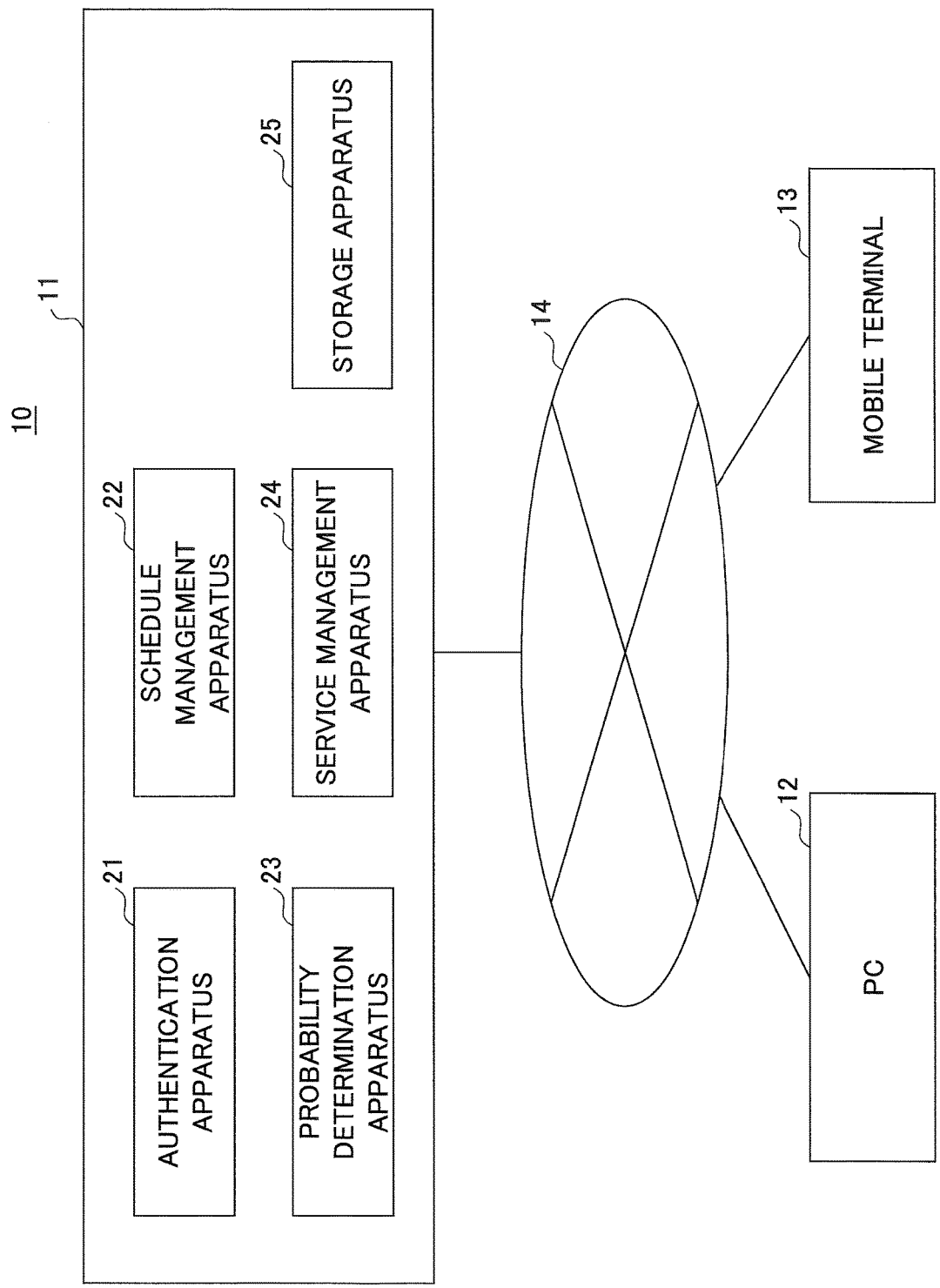
FIG. 1 is a drawing illustrating an exemplary information management system.

FIG. 1 is a drawing illustrating an exemplary information management system 10 according to an embodiment. The information management system 10 may include an information management server (information management apparatus) 11, a PC (first terminal) 12, and a mobile terminal (second terminal) 13. The information management server 11, the PC 12, and the mobile terminal 13 are connected to each other via a communication network 14 such as the Internet or a local area network (LAN) so as to be able to send and receive data.

The information management server 11 manages the PC 12 and the mobile terminal 13 based on, for example, user information and terminal information, and manages various types of information obtained from the PC 12 and the mobile terminal 13. For example, the information management server 11 manages time information and action information in association with each other, and manages schedule information that can be changed by the PC 12 and the mobile terminal 13 as needed. The information management server 11 also manages past schedule information, and provides services corresponding to a changed schedule to a user of the mobile terminal 13 based on user information for personal authentication and terminal information for device authentication.

The PC 12 is a general-purpose personal computer placed, for example, in an indoor location, and may include functions to generate, edit, send, and store image data. According to an instruction from a user, the PC 12 requests the information management server 11 to register or update schedule information. Also, in response to a request from the information management server 11 to collaborate with the mobile terminal 13, the PC 12 sends and receives data to and from the mobile terminal 13.

The mobile terminal 13 is a portable terminal that is owned, for example, by a user, is movable to indoor and outdoor locations, and operates with a battery. According to an instruction from the user, the mobile terminal 13 requests the information management server 11 to register or update schedule information.

Also, the mobile terminal 13 includes measurement devices for obtaining environmental information. For example, the mobile terminal 13 sends environmental information continuously measured by the measurement devices to the information management server 11 at predetermined time intervals. Here, the environmental information may include, but is not limited to, at least one of location information of the mobile terminal 13, orientation information of the mobile terminal 13, pedometer information of the user of the mobile terminal 13, and ambient sound level information. For example, the mobile terminal 13 may be, but is not limited to, a tablet terminal, a smartphone, or a notebook PC.

In the example of FIG. 1, only one PC 12 and one mobile terminal 13 are provided. However, the information management system 10 may include multiple PCs 12 and/or multiple mobile terminals 13. Also, the information management system 10 may be used by one or more users.

The information management server 11 of FIG. 1 includes an authentication apparatus 21, a schedule management apparatus 22, a probability determination apparatus 23, a service management apparatus 24, and a storage apparatus 25.

The authentication apparatus 21 performs authentication to enable the PC 12 and the mobile terminal 13 to collaborate and exchange data with each other.

The schedule management apparatus 22 manages, for each user, schedule information that is used, for example, for authentication by the authentication apparatus 21. As a non-limiting example, the schedule management apparatus 22 manages schedule information for each use identification number (e.g., a usage number).

The probability determination apparatus 23 determines the probability that a user of the mobile terminal 13 is a genuine user based on, for example, environmental information obtained from the mobile terminal 13. Here, a probability can be obtained, for example, by determining the frequency that a location and an action of the user appear in past schedule information at the corresponding time, and determining the accuracy of environmental information obtained by the measurement devices.

The service management apparatus 14 manages, for example, connections between the PC 12 and the mobile terminal 13, network services using external apparatuses connected to the communication network 14, and the provision of services.

The storage apparatus 25 stores, for example, past schedule information based on past "usage numbers" for respective users. For example, the storage apparatus 25 may be, but is not limited to, a database (DB).

Figure 2A:
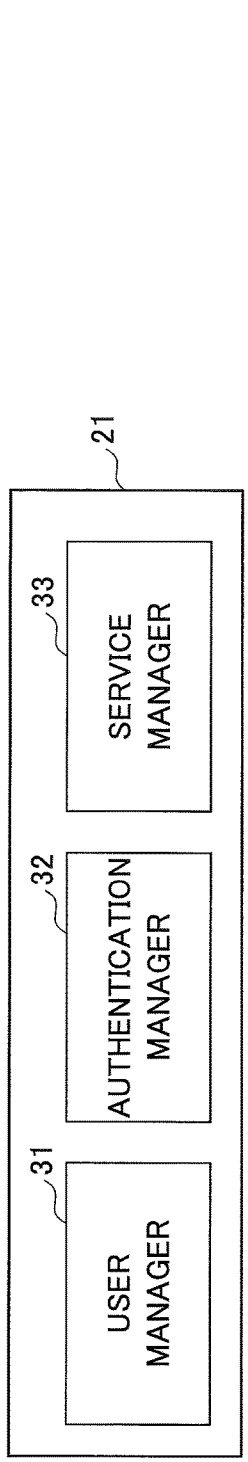
FIG. 2A is a block diagram illustrating an exemplary configuration of an authentication apparatus.
Figure 2B:
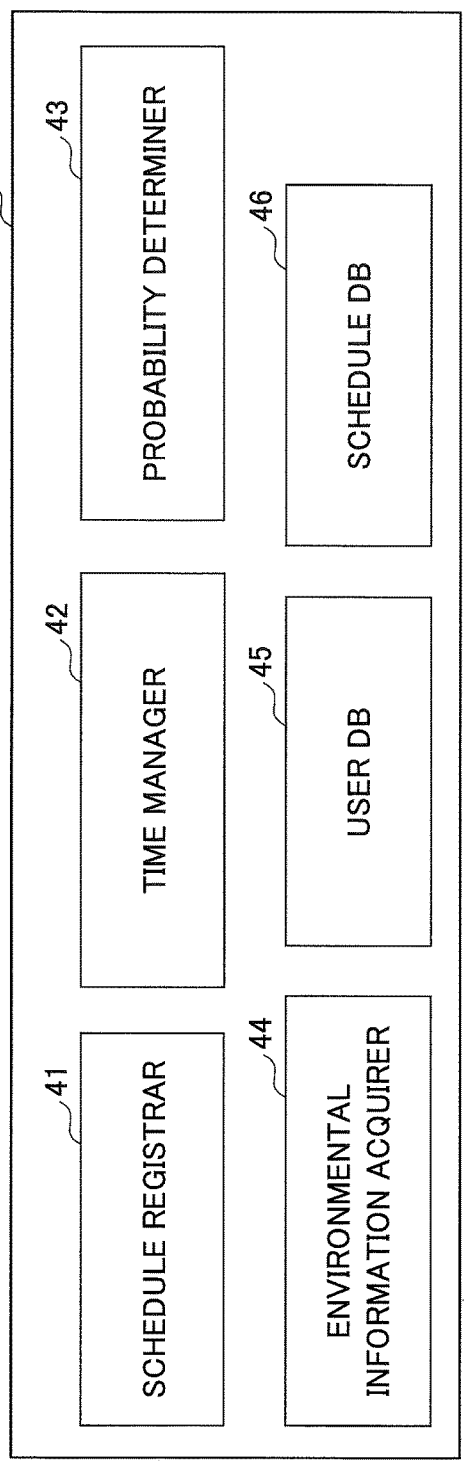
FIG. 2B is a block diagram illustrating an exemplary configuration of a schedule management apparatus.
Figure 2C:
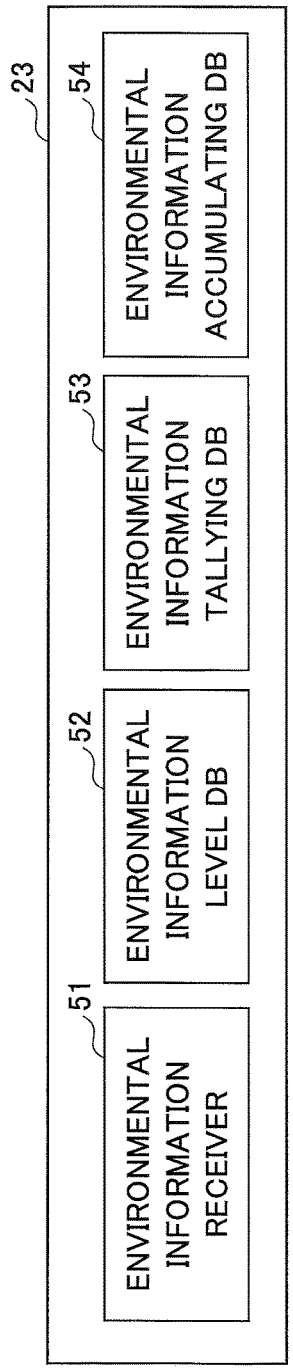
FIG. 2C is a block diagram illustrating an exemplary configuration of a probability determination apparatus.

FIG. 2A is a block diagram illustrating an exemplary configuration of the authentication apparatus 21, FIG. 2B is a block diagram illustrating an exemplary configuration of the schedule management apparatus 22, and FIG. 2C is a block diagram illustrating an exemplary configuration of the probability determination apparatus 23.

The authentication apparatus 21 of FIG. 2A includes a user manager 31, an authentication manager 32, and a service manager 33.

The user manager 31 manages user information for users who access the information management server 11 to use services. Also, the user manager 31 obtains continuously-measured environmental information from the mobile terminal 13, and performs user management based on schedule information obtained from the schedule management apparatus 22 to continue to dynamically provide services based on the obtained environmental information.

The user manager 31 identifies a user based on user information such as a user ID and a password or biometric information that is initially entered from the PC 12 or the mobile terminal 13 when the user logs into the information management server 11 to use services implemented in the present embodiment. The user manager 31 also manages device registration to enable the PC 12 and the mobile terminal 13 to collaborate and exchange data with each other, and stores registered device authentication information.

When the PC 12 or the mobile terminal 13 is connected to the information management server 11, the user manager 31 identifies a usage number based on, for example, a user ID to enable the schedule management apparatus 22 and the probability determination apparatus 23 to start or prepare for the provision of services. As a result, it becomes possible to start collaboration between the apparatuses or collaboration between the PC 12 or the mobile terminal 13 and the apparatuses.

The authentication manager 32 manages authentication information for identifying users. The authentication information may be, for example, biometric information that is initially entered when logging into the information management server 11, or a user ID and a password that are entered only once when logging into the information management server 11.

For example, the authentication manager 32 determines whether to continue to provide a service to the PC 12 or the mobile terminal 13 (i.e., performs authentication). The authentication manager 32 receives environmental information continuously measured by the mobile terminal 13 from the schedule management apparatus 22, and determines whether to continue to dynamically provide a service for each usage number.

The service manager 33 manages services using the PC 12 and the mobile terminal 13 as well as services provided, for example, by other apparatuses on the communication network 14. For example, the service manager 33 manages linkage information for services registered in advance by users, and provides those services in response to requests from the users. Also, when it is determined that a user of the mobile terminal 13 is not a genuine user, the service manager 33 can limit services available to the user (e.g., stop providing services).

The schedule management apparatus 22 of FIG. 2B includes a schedule registrar 41, a time manager 42, a probability determiner 43, an environmental information acquirer 44, a user DB 45, and a schedule DB 46.

The schedule registrar 41 registers schedule information entered by users from the PC 12 and the mobile terminal 13, and updates the registered schedule information. As a non-limiting example, schedule information may be registered and updated every predetermined hours, daily, weekly, on predetermined days of the week, or monthly.

The schedule registrar 41 may also be configured to generate an information input screen for allowing the user to enter schedule information using the PC 12 or the mobile terminal 13, and to cause the PC 12 or the mobile terminal 13 to display the generated information input screen.

The schedule registrar 41 includes a management DB (the user DB 45) for managing schedule information for respective usage numbers, and a management DB (the schedule DB 46) for managing schedule information corresponding to the usage numbers.

For example, the schedule registrar 41 performs processes to register schedule information in the schedule DB 46 in association with usage numbers, and to update the schedule information. The results of the processes are reflected in the schedule DB 46.

The time manager 42 manages and reports the time of environmental information obtained from the environmental information acquirer 44 for each usage number. For example, the time manager 42 obtains, for each usage number, numeric data of environmental information, which is continuously measured and transmitted at predetermined time intervals by the mobile terminal 13, from the environmental information acquirer 44, adds the usage number and time information to the obtained numeric data, and outputs the numeric data with the usage number and the time information to the probability determination apparatus 23. The time manager 42 also reports an event indicating that no information from the mobile terminal 13 is obtained after a predetermined period of time.

The probability determiner 43 determines whether an accessed user is a genuine user when, for example, schedule information is changed. For example, the probability determiner 43 determines the probability that a user of the mobile terminal 13 is a genuine user based on past schedule information corresponding to a usage number. The probability determiner 43 updates an expected schedule before an actual time registered by the schedule registrar 41.

For example, the probability determiner 43 determines the probability based on environmental information levels, numeric environmental information from the mobile terminal 13, and tallied environmental information obtained from the probability determination apparatus 23 for each usage number. Also, the probability determiner 43 reports the determination result (e.g., to permit or not permit providing a service to the mobile terminal 13) to the authentication apparatus 21. The probability determiner 43 may be configured to report the determination result to the authentication apparatus 21 before the actual time. This makes it possible to determine whether a user is a genuine user before providing a service, and makes it possible to prevent unauthorized use of a service by, for example, impersonation.

The environmental information acquirer 44 obtains, for each usage number, continuously-measured environmental information transmitted from the mobile terminal 13 at predetermined time intervals, and converts the obtained environmental information into numeric data. For example, the environmental information acquirer 44 outputs the numeric data to the time manager 42 for each usage number.

The user DB 45 manages user information to be used by the apparatuses in the information management server 11. The schedule DB 46 manages schedule information for each usage number.

The probability determination apparatus 23 of FIG. 2C includes an environmental information receiver 51, an environmental information level DB 52, an environmental information tallying DB 53, and an environmental information accumulating DB 54.

The environmental information receiver 51 receives environmental information for each usage number, and stores the received environmental information in the environmental information level DB 52, the environmental information tallying DB 53, and the environmental information accumulating DB 54 depending on the types of received information.

For example, the environmental information receiver 51 receives environmental information for each usage number via the schedule management apparatus 22, and stores the environmental information in the respective databases of the probability determination apparatus 23 to generate structured databases. For this purpose, the environmental information receiver 51 categorizes environmental information into various environmental information items, and determines probability levels and tolerable ranges of the environmental information items based on the environmental information accumulating DB 54.

The environmental information level DB 52 stores and manages, for the environmental information received by the environmental information receiver 51, previously-stored environmental information and information on probability levels determined in a user environment.

For example, the environmental information level DB 52 stores probability levels corresponding to respective environmental information items (measurement devices). The probability levels are not necessarily fixed for the respective environmental information items (measurement devices), and may be changed depending on the precision of the measurement devices. In this case, the mobile terminal 13 may be configured to report, in advance, the types of environmental information items (measurement devices) to the information management server 11 (the schedule management apparatus 22) to enable the information management server 11 to manage the corresponding probability levels.

The environmental information tallying DB 53 tallies environmental information according to predetermined criteria. For example, the environmental information tallying DB 53 tallies environmental information values obtained from the measurement devices of the mobile terminal 13. The environmental information tallying DB 53 may be configured to tally only environmental information values within a predefined probability range, or may be configured to tally all environmental information values.

The environmental information accumulating DB 54 stores environmental information without change in association with past time information. The environmental information stored in the environmental information accumulating DB 54 is used to determine probabilities. For example, the environmental information accumulating DB 54 stores past environmental information for each usage number. Also, the environmental information accumulating DB 54 stores, in order of time, a large amount of schedule information within a predetermined past time period without change, regardless of whether the schedule information is used for determining probabilities.

The authentication apparatus 21, the schedule management apparatus 22, the probability determination apparatus 23, the service management apparatus 24, and the storage apparatus 25 may be implemented by one information processing apparatus. Also, the authentication apparatus 21, the schedule management apparatus 22, the probability determination apparatus 23, the service management apparatus 24, and the storage apparatus 25 may be implemented by a cloud computing system including one or more information processing apparatuses.

<Hardware Configuration of Information Management Server>

Figure 3:
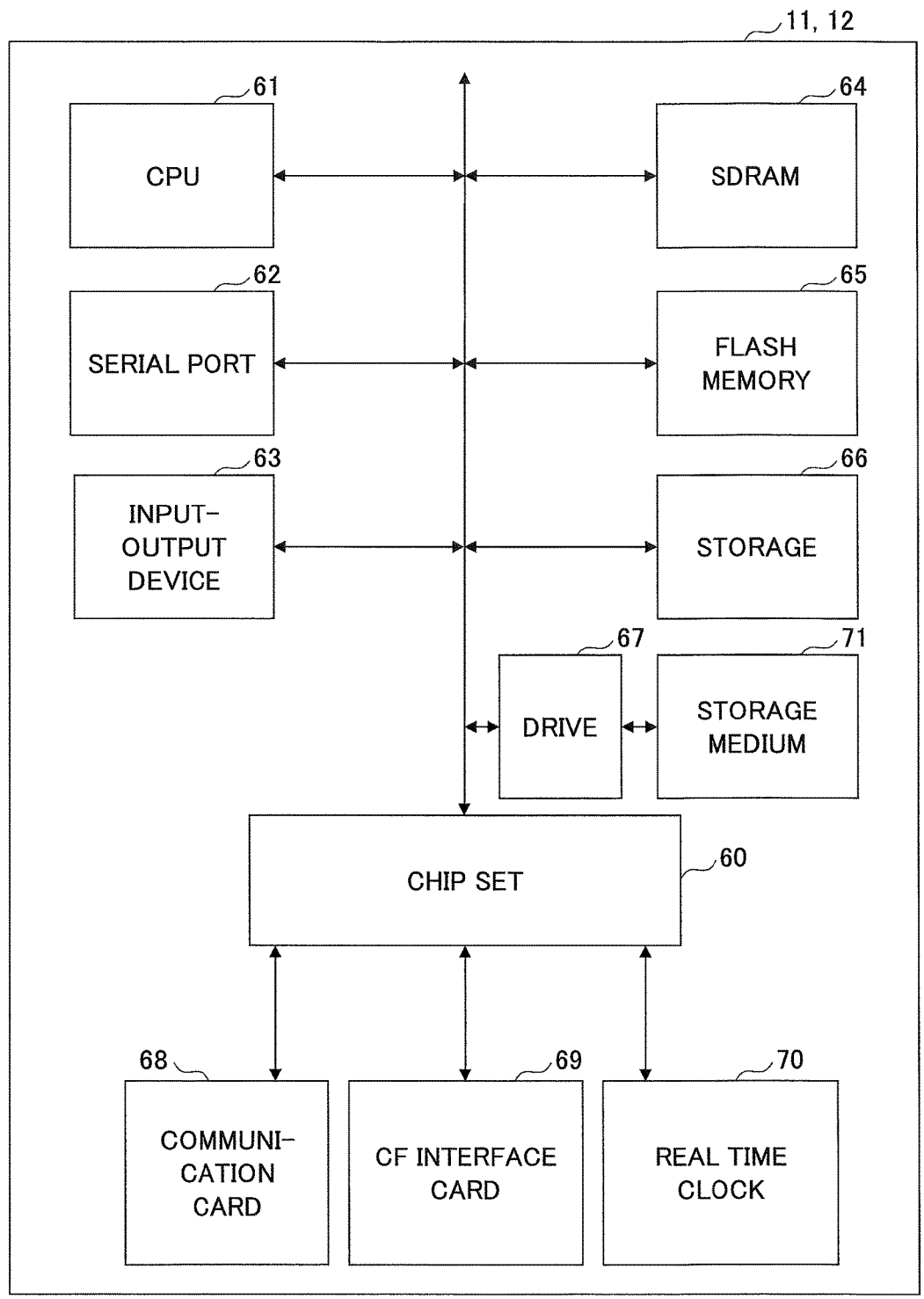
FIG. 3 is a block diagram illustrating an exemplary hardware configuration of an information management server.

FIG. 3 is a block diagram illustrating an exemplary hardware configuration of the information management server 11. The exemplary hardware configuration of FIG. 3 includes a chip set 60, a central processing unit (CPU) 61, a serial port 62, an input-output device 63, a synchronous dynamic random access memory (SDRAM) 64, a flash memory 65, a storage 66, a drive 67, a communication card 68, a Compact Flash (CF) (registered trademark) interface card 69, and a real time clock 70.

The exemplary hardware configuration of FIG. 3 may be applied to each of the authentication apparatus 21, the schedule management apparatus 22, the probability determination apparatus 23, the service management apparatus 24, and the storage apparatus 25 included in the information management server 11. Although dedicated software for implementing the corresponding process is provided for each of these apparatuses, the apparatuses may have substantially the same hardware configuration.

The chip set 60 is connected via, for example, a data bus and a control bus to other hardware components of the information management server 11. The chip set 60 controls interactions among the other hardware components connected via the buses to the chip set 60. For example, the chip set 60 may include a control circuit to interface the CPU 61 and other hardware components, and registers for controlling the other hardware components.

The CPU 61 controls the entire information management server 11. The CPU 61 controls the entire computer (the information management server 11) according to a control program such as an operating system (OS) and execution programs stored in a main memory such as the flash memory 65 to perform, for example, various calculations and data input/output with other hardware components. For example, the CPU 61 controls processes performed by the authentication apparatus 21, the schedule management apparatus 22, the probability determination apparatus 23, the service management apparatus 24, and the storage apparatus 25.

The CPU 61 may obtain information necessary for the execution of programs from a secondary storage such as the storage 66. Also, the CPU 61 may store execution results of the programs in the SDRAM 64, the flash memory 65, and/or the storage 66.

Each of the serial port 62, the communication card 68, and the CF interface card 69 implements a communication device that sends and receives data via the communication network 14 to and from the PC 12, the mobile terminal 13, and other external apparatuses.

Also, each of the serial port 62, the communication card 68, and the CF interface card 69 may be used to obtain execution programs and data, and to send execution results of the execution programs and/or the execution programs themselves to external apparatuses. Each of the serial port 62, the communication card 68, and the CF interface card 69 may include a function to extract network timing from information received from the communication network 14, and to synchronize the communication speed and the data transmission rate. The CF interface card 69 may be used, for example, for the maintenance of the apparatuses included in the information management server 11. Because the storage 66 is included in the exemplary configuration of FIG. 3, the CF interface card 69 is used for data processing with the PC(s) 12 and the mobile terminal(s) 13.

The input-output device 63 receives instructions input by, for example, an administrator of the information management server 11, and outputs execution results. The input-output device 63 may include an input interface such as a keyboard and/or a mouse, and an output interface such as a display. Also, the input-output device 63 may include a component such as a touch panel having both of input and output functions. The input-output device 63 may be configured to input and output either analog or digital data.

The SDRAM 64 and the flash memory 65 are examples of main memories. The storage 66 is an example of a secondary storage.

The SDRAM 64 and the flash memory 65 store execution programs read by the CPU 61 from, for example, the storage 66, and store data obtained during the execution of programs. Also, each of the SDRAM 64 and the flash memory 65 may be used as a temporary storage area.

The flash memory 65 may be implemented by, for example, a read-only memory (ROM) and/or a random access memory (RAM). The flash memory 65, for example, stores a kernel, applications corresponding to the apparatuses in the information management server 11, and configuration files. The flash memory 65 may include an extended area.

The storage 66 may be implemented by, but is not limited to, a hard disk drive (HDD) or a solid state drive (SSD). The storage 66 stores execution programs and control programs, and performs data input/output as necessary.

The drive 67 is an interface on which a storage medium 71 storing programs can be mounted. As a non-limiting example, the storage medium 71 may be implemented by a portable storage medium such as a universal serial bus (USB) memory, a compact disk read-only memory (CD-ROM), or a digital versatile disk (DVD). Execution programs to be installed in the information management server 11 (or a computer implementing each apparatus) may be provided by the storage medium 71.

According to a control signal from the CPU 61, the drive 67 installs execution programs stored in the storage medium 71 into a secondary storage such as the storage 66.

The real time clock 69 manages execution time of processes performed by the information management server 11. The real time clock 69 also controls timing of processes performed by the information management server 11 to synchronize the processes.

The hardware configuration described above may also be applied to the PC 12.

<Hardware Configuration of Mobile Terminal>

Figure 4:
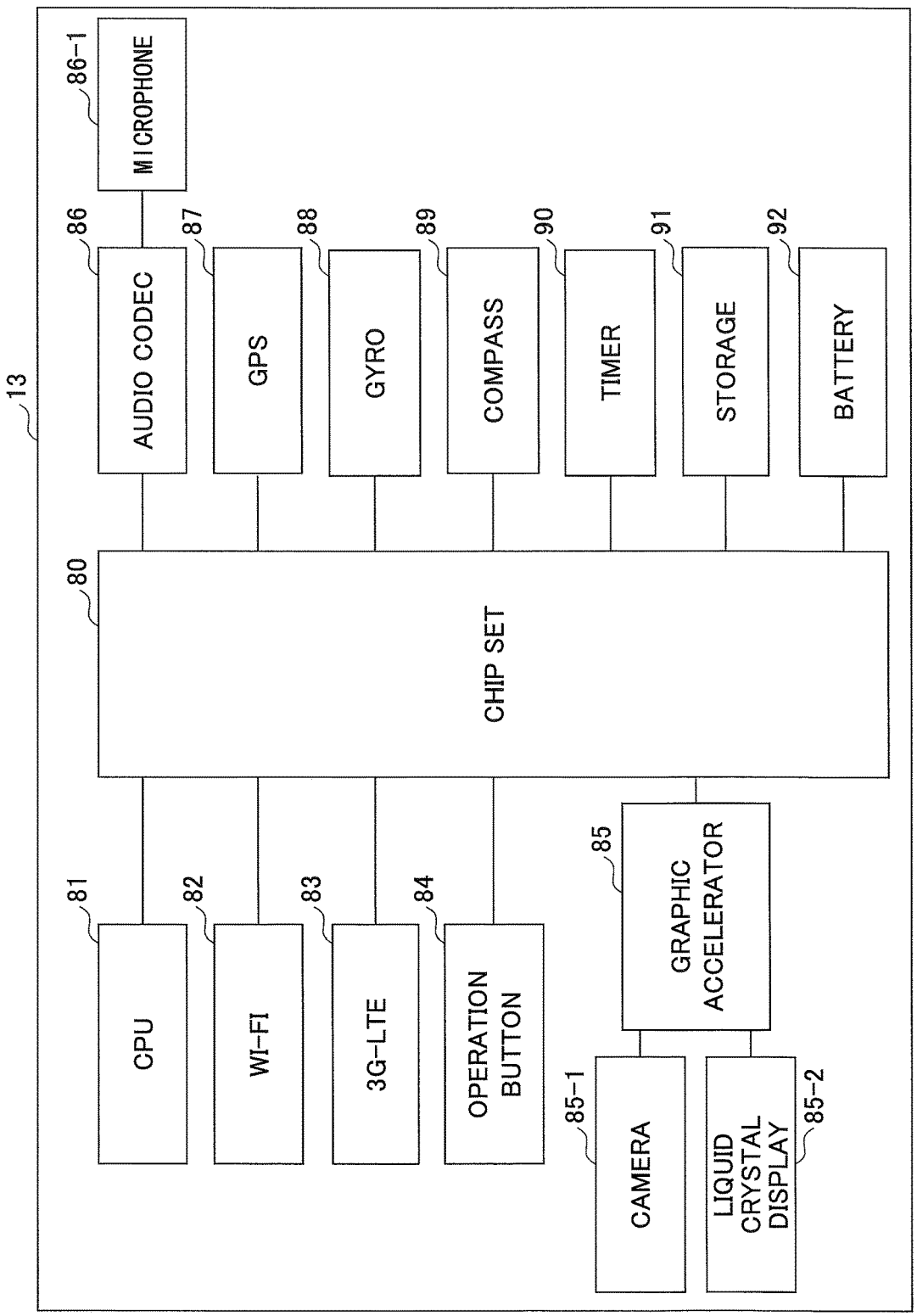
FIG. 4 is a block diagram illustrating an exemplary hardware configuration of a mobile terminal.

FIG. 4 is a block diagram illustrating an exemplary hardware configuration of the mobile terminal 13. The mobile terminal 13 of FIG. 4 includes a chip set 80, a CPU 81, a Wi-Fi (registered trademark) 82, a 3G-LTE 83, an operation button 84, a graphic accelerator 85, an audio codec 86, a global positioning system (GPS) 87, a gyro 88, a compass 89, a timer 90, a storage 91, and a battery 92.

The mobile terminal 13 includes sensors such as the GPS 87, the gyro 88, and the compass 89 as measurement devices (measurement units) for obtaining environmental information. The mobile terminal 13 can also obtain sound level information input from a microphone 86-1 as environmental information. The mobile terminal 13 can further obtain an image captured by a camera 85-1 as environmental information. The hardware components described above may be either included in the mobile terminal 13 or provided as external devices.

The chip set 80 is connected via, for example, a data bus and a control bus to other hardware components of the mobile terminal 13. The chip set 80 controls interactions among the other hardware components connected via the buses to the chip set 80. For example, the chip set 80 may include a control circuit to interface the CPU 81 and other hardware components, and registers for controlling the other hardware components.

The CPU 81 controls the entire mobile terminal 13. The CPU 81 controls the entire computer (the mobile terminal 13) according to a control program such as an operating system (OS) and execution programs stored in the storage 91 to perform, for example, various calculations and data input/output with other hardware components.

The CPU 81 may obtain information necessary for the execution of programs from a secondary storage such as the storage 91. Also, the CPU 81 may store execution results of the programs in the storage 91. As a non-limiting example, the CPU 81 performs an authentication process and a communication process according to the present embodiment.

The Wireless-Fidelity (Wi-Fi) 82 and the 3GPP-Long Term Evolution (3G-LTE) 83 are communication devices that, for example, are connected via the communication network 14 to the information management server 11 and wirelessly send and receive data to and from the information management server 11. Each of the Wi-Fi 82 and the 3G-LTE 83 performs a communication process according to a standardized communication protocol. Communication devices of the mobile terminal 13 are not limited to the Wi-Fi 82 and the 3G-LTE 83. In the present embodiment, location information of the mobile terminal 13 may be obtained based on access points used by the Wi-Fi 82 and the 3G-LTE 83. Also, information indicating that an access point used by the Wi-Fi 82 or the 3G-LTE 83 has been changed may also be used as environmental information.

The operation button 84 receives an input from a user of the mobile terminal 13. The operation button 84 may be implemented by one or more buttons formed on the mobile terminal 13 or one or more buttons displayed on a touch panel of a liquid crystal display 85-2.

The graphic accelerator 85 performs image processing on behalf of the CPU 81. For example, the graphic accelerator 85 performs predetermined image processing on an image or a video obtained by the camera 85-1 that is an example of an imaging device, and performs predetermined image processing on an image to be output to the liquid crystal display 85-2 that is an example of a display. Using the graphic accelerator 85 makes it possible to reduce the processing load of the CPU 81 and improve its performance. However, the mobile terminal 13 may have a configuration not including the graphic accelerator 85.

The audio codec 86 generates an audio signal based on an ambient sound around the mobile terminal 13 obtained by the microphone 86-1. The audio codec 86 may also generate an audio signal based on voice sound of a user obtained by the microphone 86-1.

The GPS 87 is a location measurement device that measures the location of the mobile terminal 13 and generates location information. The location information may be represented by, for example, the longitude and latitude of the mobile terminal 13, but may also be represented by any other coordinate system.

The gyro 88 is a pedometer that detects vibrations of the mobile terminal 13 using, for example, a gyro sensor and converts the detected vibrations into a number of steps. For example, the gyro 88 may be configured to convert one vibration into one step, and may also be configured to measure a traveled distance based on the measured number of steps and a preset number of steps.

The compass 89 is an example of an orientation measurement device. For example, the compass 89 may be configured to measure the orientation of the mobile terminal 13 using a magnetic compass, or to detect geomagnetism and determine the orientation of the mobile terminal 13 based on the detected geomagnetism.

The timer 90 manages execution time of processes performed by the mobile terminal 13. The timer 90 also controls timing of processes performed by the mobile terminal 13 to synchronize the processes.

The storage 91 may be implemented by, for example, but is not limited to, an HDD or an SSD. The storage 91 stores execution programs and control programs, and performs data input/output as necessary. Also, the storage 91 is used as a storage area for temporarily storing various types of data such as images and text information stored in the PC 12 and to be displayed on the mobile terminal 13. The mobile terminal 13 may also include an SDRAM and/or a flash memory.

The battery 92 is a power supply that supplies power to other components of the mobile terminal 13. The battery 92 may be implemented by a rechargeable secondary battery or a primary battery such as a dry cell.

The hardware configuration of the mobile terminal 13 is not limited to the above example. For example, in addition to the measurement devices (measurement units) described above, the mobile terminal 13 may include temperature measurement device for measuring an ambient temperature around the mobile terminal 13. Also, the mobile terminal 13 may include a humidity measurement device for measuring the humidity around the mobile terminal 13, and an illuminance measurement device for measuring the brightness (or illuminance) around the mobile terminal 13. Further, the mobile terminal 13 may include a biometric information measurement device for obtaining biometric information (e.g., a pulse rate and a blood pressure) of a user of the mobile terminal 13.

<Schedule Registration Process>

Figure 5:
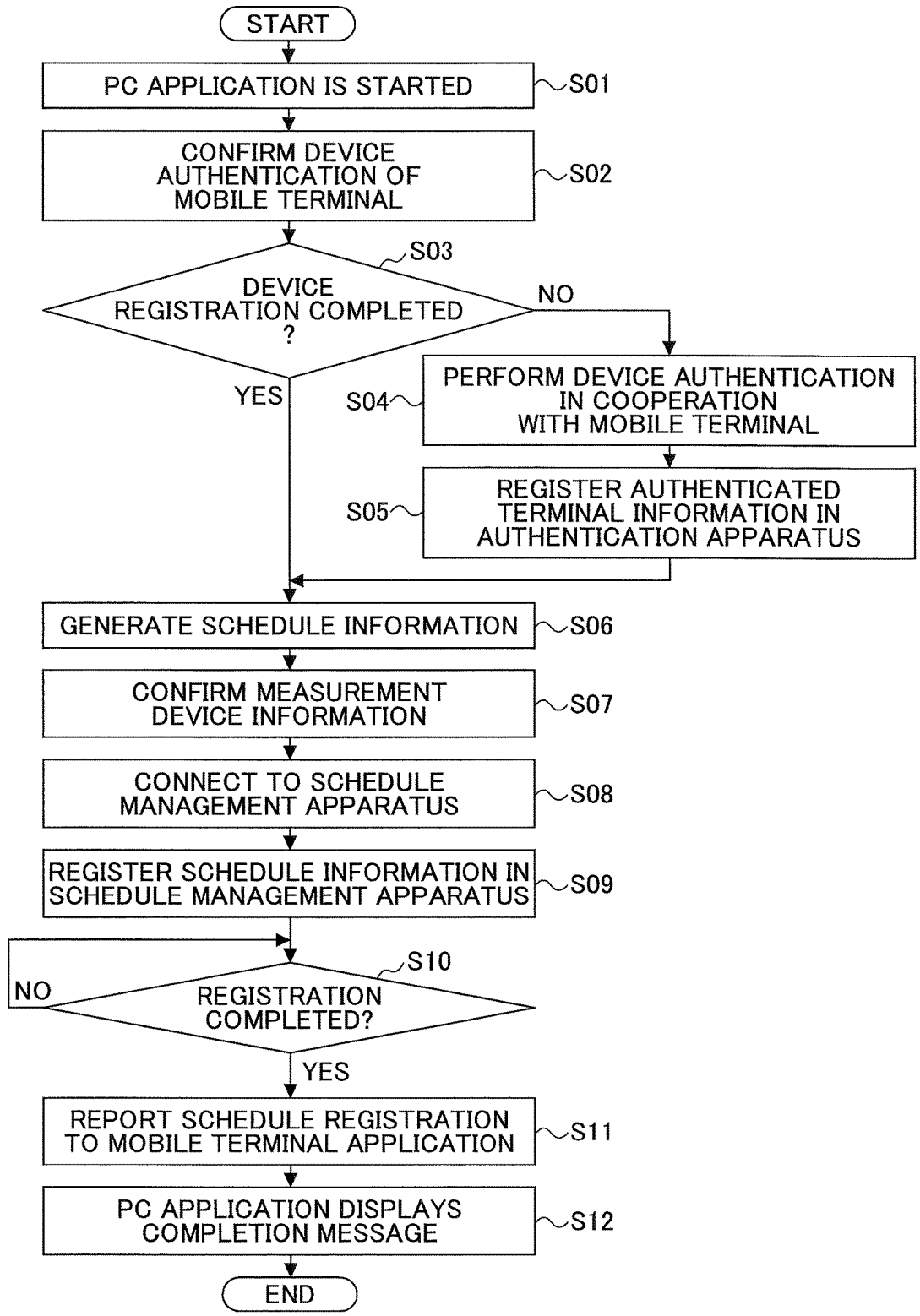
FIG. 5 is a flowchart illustrating an exemplary schedule registration process.

An exemplary schedule registration process of the present embodiment is described below with reference to FIG. 5. FIG. 5 is a flowchart illustrating an exemplary schedule registration process. In a non-limiting example of FIG. 5, it is assumed that a schedule is registered in the information management server 11 by the PC 12.

In the example of FIG. 5, a program (e.g., a PC application) that performs an information management process of the present embodiment is started on the PC 12 in response to an instruction from the user (S01). Next, the PC 12 accesses the information management server 11 via the communication network 14, and confirms device authentication of the "collaborating" mobile terminal 13 that is to collaborate with the PC 12 (S02).

The PC 12 determines whether device registration of the mobile terminal 13 has been completed (S03). When the device registration has not been completed (NO at S03), the PC 12 performs device authentication in cooperation with the "collaborating" mobile terminal 13 (S04). The PC 12 registers authenticated terminal information in the authentication apparatus 21 (S05).

When it is determined at step S03 that the device registration has been completed (YES at S03) or after step S05, the PC 12 generates schedule information (S06), and confirms measurement device information on measurement devices provided in the mobile terminal 13 (S07).

At step S06, when the registration of the mobile terminal 13 has been confirmed, the PC 12, for example, displays an information input screen generated by the schedule registrar 41 of the schedule management apparatus 22 of the information management server 11. This may be done by incorporating data of an existing schedule application. Also, the PC 12 may embed the measurement device information on the measurement devices of the mobile terminal 13 in the information input screen. For example, the PC 12 may embed, in the information input screen, measurement device information on measurement devices that are relevant to a schedule to be registered or that are included in or can be connected to the mobile terminal 13 of the user. When a schedule is changed, the embedded measurement device information makes it possible to obtain environmental information from the measurement devices set during the registration of the schedule as well as to use the measurement devices for authentication.

After confirming the measurement device information, the PC 12 connects to the schedule management apparatus 22 (S08), and registers the schedule information in the schedule management apparatus 22 (S09). In this step, the PC application obtains identification information (mobile terminal ID) of the mobile terminal 13, and registers the mobile terminal ID in the authentication apparatus 21 in association with identification information (PC ID) of the PC 12. This makes it possible to use the mobile terminal ID registered by the PC application as one of authentication criteria.

After device information is registered in the authentication apparatus 21 of the information management server 11, the PC 12 obtains a usage number issued by the authentication apparatus 21. The information management server 11 manages schedule information for each user based on the usage number issued by the authentication apparatus 21. The schedule information is registered via the authentication apparatus 21 in the schedule management apparatus 22.

At this stage, the information management server 11 consolidates measurement device information and past environmental information associated with the same usage number to prepare for a schedule change or user authentication performed when a schedule is changed. In the present embodiment, even when past environmental information is not available, it only affects the degree of probability described below and the probability can still be used for user authentication.

The PC 12 determines whether a report indicating the completion of the registration of the schedule information has been received from the schedule management apparatus 22 (S10). When the report has not been received (i.e., the registration has not been completed) (NO at S10), the PC 12 waits until the registration is completed.

When the registration has been completed (YES at S10), the PC 12 reports the registration of the schedule information to a program (e.g., a mobile terminal application) being executed by the "collaborating" mobile terminal 13 (S11), and the PC application displays a message indicating the completion on a screen of the PC 12. As a non-limiting example, the PC 12 reports the registration of the schedule information to the mobile terminal 13 via the information management server 11.

<Device Authentication Process>

Figure 6:
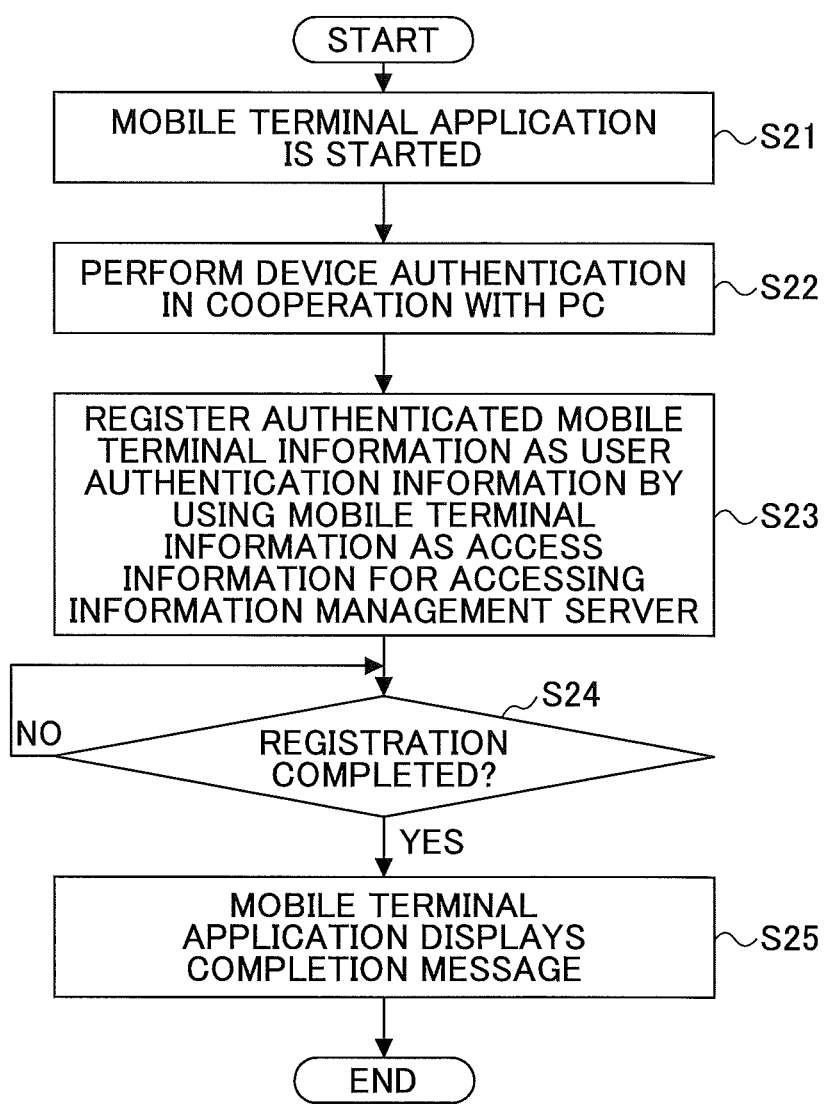
FIG. 6 is a flowchart illustrating an exemplary device authentication process.

An exemplary device authentication process performed at the mobile terminal 13 at step S04 in FIG. 5 is described below with reference to FIG. 6. FIG. 6 is a flowchart illustrating an exemplary device authentication process.

In the example of FIG. 6, a program (e.g., a mobile terminal application) that performs an information management process of the present embodiment is started on the mobile terminal 13 in response to an instruction from the user (S21).

Next, the mobile terminal 13 performs device authentication in cooperation with the "collaborating" PC 12 (S22). At step S22, as a non-limiting example, the mobile terminal 13 performs device authentication in cooperation with the "collaborating" PC 12 via the information management server 11.

After the device authentication, the mobile terminal 13 registers authenticated mobile terminal information as user authentication information in the information management server 11 by using the mobile terminal information as access information for accessing the information management server 11 (S23). The mobile terminal information is, for example, a user ID that is used to upload schedule information input on the PC 12.

Next, the mobile terminal 13 determines whether the registration of the mobile terminal information has been completed (S24). When the registration has not been completed (NO at S24), the mobile terminal 13 waits until the registration is completed. On the other hand, when the registration has been completed (YES at S24), the mobile terminal application displays a message indicating the completion of the registration on a screen of the mobile terminal 13 (S25), and terminates the process.

<Initial Device Authentication Process and Server Registration Process>

Examples of an initial device authentication process and a server registration process are described below. The PC application and the mobile terminal application are started, and a device authentication process is performed for the PC 12 and the mobile terminal 13 that are to collaborate with each other. The device authentication process may be performed by identifying unique device information of the PC 12 and the mobile terminal 13 in a wireless environment such as a Wi-Fi network (wireless LAN) or a Bluetooth (registered trademark) network. Also, the device authentication process may be performed by recognizing the PC 12 and the mobile terminal 13 connected via, for example, USB cables.

On an assumption that the mobile terminal 13 is held by a genuine user, identification (or authentication) of the user of the mobile terminal 13 may be performed, for example, using unique device information such as a model name, a terminal version, or a terminal serial number of the mobile terminal 13. The terminal serial number can be used to identify each mobile terminal 13, and therefore can be used to identify a person carrying the identified mobile terminal 13. Also, International Mobile Equipment Identity (IMEI), which is defined by a standard and is given by the manufacturer to the mobile terminal 13, may be used for this purpose. The PC 12 may be identified by a Media Access Control (MAC) address or Basic Input/Output System (BIOS) information, which is also available in the mobile terminal 13.

In the present embodiment, unique information of the mobile terminal 13 is sent to the PC 12 and is registered in the authentication apparatus 21 together with unique information of the PC 12. That is, unique information of both of the PC 12 and the mobile terminal 13 that have passed through the device authentication is registered in the authentication apparatus 21. The mobile terminal 13 can change schedule information using the unique information.

When the registration of the device information (or the device authentication) at the authentication apparatus 21 is completed, the authentication apparatus 21 sends a completion report to the PC 12. When receiving the completion report, the PC 12 sends a registration completion report to the mobile terminal 13 via an interface (e.g., Wi-Fi), and the process is terminated.

<Initial Registration Information>

Next, an example of initial registration information is described with reference to FIG. 7. FIG. 7 is a table illustrating an example of initial registration information. As illustrated by FIG. 7, information items of the initial registration information include, but are not limited to, "usage number", "schedule registration information", "PC ID", "mobile terminal ID", "user ID", and "password".

The "usage number" is used, for example, by the authentication apparatus 21 to manage each set of schedule information. In other words, the "usage number" is information for identifying a user of a service at the information management server 11. The "schedule registration information" is information for identifying registered schedule information.

The "PC ID" is information for identifying the PC 12. For example, the "PC ID" may be represented by, but is not limited to, a BIOS device number or a MAC address.

The "mobile terminal ID" is information for identifying the mobile terminal 13. For example, the "mobile terminal ID" may be represented by, but is not limited to, a serial number or an IMEI number of the mobile terminal 13.

The "user ID" is identification information for uniquely identifying a user. The "user ID" is used, for example, to upload schedule information input via the PC 12 placed in an indoor location such as a home or an office. For example, the "user ID" may be represented by, but is not limited to, an email address. The "password" is an example of authentication information used for authentication.

At the initial registration stage, the user of the mobile terminal 13 has not requested a dynamic service, and therefore uploads data via the PC 12.

<Schedule Information>

FIG. 8 is a table illustrating an example of schedule information. In the example of FIG. 8, information items of the schedule information include, but are not limited to, "usage number", "action information", "time information (hour:minute)", "location information (degrees)", "orientation information (degrees)", "pedometer information (steps)", and "sound level information (dB)".

In the present embodiment, a user, for example, accesses the information management server 11 using the PC 12 at the beginning of a day, and registers schedule information for the day in the schedule management apparatus 22 of the information management server 11. The schedule management apparatus 22 stores the registered schedule information in the storage apparatus 25.

For example, the user registers "action information", "time information (hour:minute)", and "location information (degrees)". The "usage number" is given to each set of newly-registered schedule information. Once registered, the schedule information can be read from the storage apparatus 25 and changed (or updated) in advance based on the "usage number". According to the present information, when the user changes schedule information while acting according to the schedule information, other information items (e.g., orientation information and pedometer information) in FIG. 8 are necessary for user authentication.

The "usage number" is used, for example, by the authentication apparatus 21 to manage each set of schedule information. In other words, the "usage number" is information for identifying a user of a service at the information management server 11.

The "action information" indicates an action (or a destination) at a specified time registered as schedule information by the user. The "time information" indicates a time associated with the "action information". For example, the "time information" indicates, but is not limited to, a time when an action indicated by the "action information" is started. In the example of FIG. 8, the "time information" is registered by the user in advance as schedule information.

The "location information" indicates a location represented by latitude and longitude (degrees). When the schedule information is registered, instead of obtaining the "location information" from the GPS 87, the schedule registrar 41, for example, refers to map data stored beforehand in the storage apparatus 25 based on place information entered as the "action information", obtains the "location information" corresponding to the place information from the map data, and enters the obtained "location information" in the schedule information. The "location information" may also be obtained and entered in any other manner. For example, the "location information" may be entered by the user in schedule information to be uploaded to the information management server 11 in association with the "action information".

The "orientation information" indicates the orientation of the mobile terminal 13. The mobile terminal 13 is supposed to be held by a hand of the user, and can indicate the direction in which the user is going to walk by an angle. As a non-limiting example, the north direction may be indicated by 0 degrees, the east direction may be indicated by 90 degrees, the south direction may be indicated by 180 degrees, and the west direction may be indicated by 270 degrees. The "orientation information" may be obtained by the compass 89 of the mobile terminal 13.

The "pedometer information" may be obtained by the gyro 88 of the mobile terminal 13. For example, the mobile terminal 13 measures vibrations with the gyro 88 and converts the vibrations into a number of steps. As another example, the mobile terminal 13 may be configured to count a number of steps based on acceleration directions.

With the above configuration, it is possible to determine means of travel of the user. For example, when the user is on a train, the mobile terminal 13 moves at a constant speed, but the number of steps is 0. When the user gets off the train, the number of steps increases. Thus, it is possible to determine whether the user moved on foot or by transportation (e.g., train or car) based on the amount of change in the location information and the amount of change in the pedometer information in a unit time.

The "sound level information" indicates an average sound pressure (dB) in a predetermined time period that is obtained via, for example, the microphone 86-1 of the mobile terminal 13.

The exemplary schedule information of FIG. 8 is automatically formulated by the authentication apparatus 21 based on schedule information registered by the user, and therefore the information items "orientation information", "pedometer information", and "sound level information" are blank. The information items of the schedule information are not limited to those illustrated in FIG. 8. For example, when the mobile terminal 13 can measure environmental information other than "orientation information", "pedometer information", and "sound level information", the measured environmental information may be registered in the schedule information. Examples of other environmental information include temperature information, humidity information, illuminance information, acceleration information, and biometric information.

<Schedule Changing Process>

Figure 10:
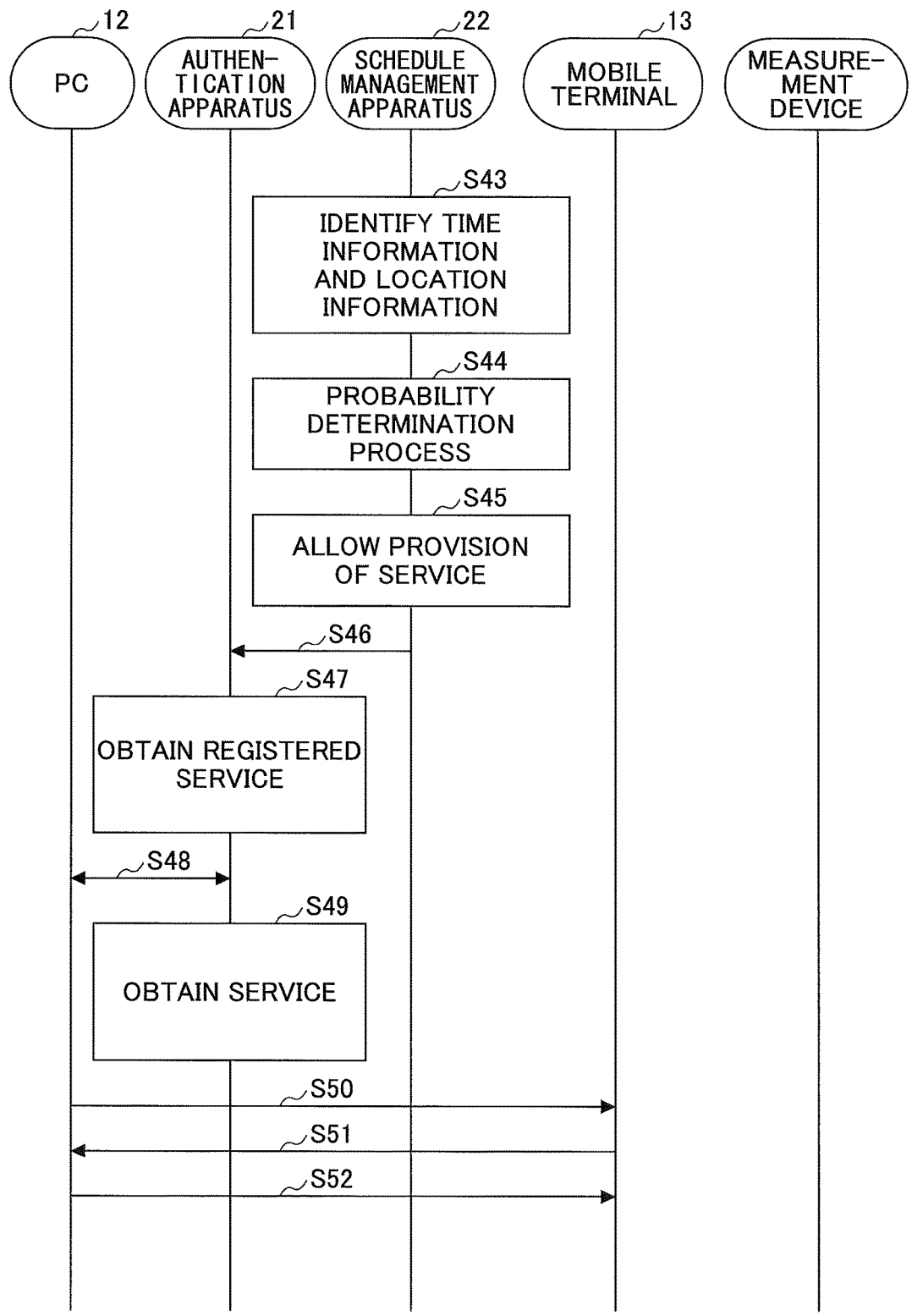
FIG. 10 is a sequence chart illustrating an exemplary schedule changing process.

Next, a schedule changing process of the present embodiment is described. FIGS. 9 and 10 are sequence charts illustrating an exemplary schedule changing process. The exemplary schedule changing process of FIGS. 9 and 10 is described using the PC 12, the authentication apparatus 21 and the schedule management apparatus 22 of the information management server 11, the mobile terminal 13, and measurement devices of the mobile terminal 13. However, the present invention is not limited to this example.

FIG. 9 illustrates an exemplary process where schedule information is updated in response to a "schedule change" entered by the user via an application installed in the mobile terminal 13. In the present embodiment, the user enters a request to change schedule information using an application installed in the mobile terminal 13.

In the example of FIG. 9, it is assumed that the user enters a schedule change via the mobile terminal 13 in a situation where the device authentication of the mobile terminal 13 and the PC 12 and the uploading of schedule information of the day have been completed.

In the present embodiment, schedule information is initially registered in the schedule management apparatus 22 on an assumption that the schedule information will not be changed. For this reason, when a schedule change is entered by the user (S31), the mobile terminal 13 sends a schedule change request to the authentication apparatus 21 (S32).

In response to the schedule change request sent at step S32, the authentication apparatus 21 performs device authentication on the mobile terminal 13. When the mobile terminal 13 is successfully authenticated, the authentication apparatus 21 completes the device authentication (S33). As a non-limiting example, the device authentication of the mobile terminal 13 may be performed based on the mobile terminal ID described above.

Next, the authentication apparatus 21 sends the schedule change request from the mobile terminal 13 to the schedule management apparatus 22 (S34). The schedule management apparatus 22 refers to the environmental information accumulating DB 54 of the probability determination apparatus 23, and obtains past environmental information corresponding to environmental information (e.g., orientation information, pedometer information, and sound level information) that corresponds to time information and location information indicated by the schedule change request. The schedule management apparatus 22 adds the obtained past environmental information to the schedule information for each time unit (S35). The schedule management apparatus 22 may also attach a valid range of probability information determined by the probability determination apparatus 23 to the past environmental information to be added.

Next, the schedule management apparatus 22 reports the above change to the authentication apparatus 21 (S36). Then, the authentication apparatus 21 reports to the mobile terminal 13 that the change has been accepted. This indicates that the schedule change request from the mobile terminal 13 has been allowed.

Next, the mobile terminal 13 monitors measurement data for a unit time counted by the timer 90 (S38). For example, the mobile terminal 13 requests the measurement devices to obtain environmental information for a unit time counted by the timer 90 from when the mobile terminal 13 enters a schedule change mode (S39). The measurement devices measure data corresponding to the requested environmental information, and outputs the measured data to the mobile terminal 13 (S40).

The mobile terminal 13 outputs (or uploads) the measured data to the schedule management apparatus 22 (S41). After the uploading is completed, the schedule management apparatus 22 sends a response to the mobile terminal 13 (S42). When the uploading fails, no response is sent at step S42. When no response has been received after a predetermined period of time, the mobile terminal 13 performs the uploading again.

The schedule management apparatus 22 identifies time information and location information in uploaded environmental information (S43). Also, the schedule management apparatus 22 compares the environmental information obtained at step S43 with the past environmental information obtained from past schedule information to obtain a probability that the user is a genuine user.

Based on the probability, the schedule management apparatus 22 determines whether to allow a service at the corresponding time and location to be provided to the mobile terminal 13 (S44). When the user of the mobile terminal 13 is highly likely a genuine user, the schedule management apparatus 22 allows the service to be provided to the mobile terminal 13 (S45).

In the present embodiment, the schedule management apparatus 22 determines whether to allow the provision of a service, and the authentication apparatus 21 provides the service. Accordingly, after determining to allow the provision of the service, the schedule management apparatus 22 sends a service provision request to the authentication apparatus 21 (S46).

Based on the service provision request from the schedule management apparatus 22, the authentication apparatus 21 determines a user ID corresponding to the mobile terminal 13, performs connection authentication with the PC 12 authenticated together with the mobile terminal 13, and obtains a registered service (S47). The registered service is a service that is registered in advance for the mobile terminal 13 or the user ID. One or more services may be registered for each mobile terminal 13 or a user ID, and a user can use a corresponding registered service based on time information and location information.

The authentication apparatus 21 performs connection authentication confirmation with the registered PC 12 (S48). When connected to the PC 12, the authentication apparatus 21 obtains a service (S49), and causes the PC 12 and the mobile terminal 13 to implement the obtained service.

For example, after the service is obtained by the authentication apparatus 21, the PC 12 sends a connection request to the mobile terminal 13 (S50). When a connection response is received from the mobile terminal 13 (S51), the PC 12 implements the service in collaboration with the mobile terminal 13.

<Example of Changed Schedule Information>

An example of changed schedule information is described below. FIG. 11 is a table illustrating an example of changed schedule information. Information items in FIG. 11 correspond to the information items of the schedule information illustrated by FIG. 8.

Here, it is assumed that schedule information of a predetermined period (e.g., one day, one week, or one month) registered in the authentication apparatus 21 is allowed to be automatically updated. The exemplary schedule information of FIG. 11 has been updated based on environmental information of the user or accumulated schedule information.

In the example of FIG. 11, the "usage number" is information used by the authentication apparatus 21 to manage each set of schedule information. For example, the user connects to the authentication apparatus 21 once in the early morning and uploads schedule information of the user in a reliable method. The schedule information may include a schedule of one day or several days. The "usage number" is used by the authentication apparatus 21 to manage the schedule information.

Any authentication method may be used to connect to the authentication apparatus 21. For example, authentication may be performed using a user ID such as an email address, a password, or biometric information such as a fingerprint.

The "action information" indicates actions (or destinations) registered as schedule information by the user.

In the example of FIG. 11, environmental information including "orientation information", "pedometer information", and "sound level information" is added to the initially uploaded schedule information based on information uploaded regularly or irregularly from the mobile terminal 13. Also in the example of FIG. 11, the "action information" and the "location information" in FIG. 8 have been changed. The "action information" and the "location information" are changed based on probable actions determined based on accumulated past schedule information.

Here, a probability can be obtained, for example, by determining the frequency that a location and an action of the user appear in past schedule information at the corresponding time, and determining the accuracy of environmental information obtained by measurement devices. For example, a probability indicates the accuracy of information of an individual and the accuracy of information obtained by measurement devices.

Each of the "orientation information", the "pedometer information", and the "sound level information" added to the schedule information is obtained by obtaining environmental information associated with the corresponding time and action from past schedule information and averaging the obtained environmental information. Accordingly, in the example of FIG. 11, data determined to be reference values based on accumulated and tallied past environmental information obtained from the measurement devices are registered in association with the corresponding times and actions.

An example of updating the schedule information is described below with reference to FIG. 11. Generally, a user acts according to the initially-registered schedule information as illustrated by the example of FIG. 8. However, it is not always possible to act as scheduled. When a schedule change occurs, with the related-art technologies, the user needs to intentionally change the schedule information to be successfully authenticated.

In the example of FIG. 11, it is assumed that an action taken by the user changed at the time of 08:30. Based on location information obtained from the GPS 87, the mobile terminal 13 reports to the authentication apparatus 21 that the mobile station 13 (or the user) is not at the scheduled location. This report enables the authentication apparatus 21 to request the mobile terminal 13 to upload location information obtained from the GPS 87 and environmental information obtained from measurement devices. As a non-limiting example, in response to the request from the authentication apparatus 21, a dedicated application (e.g., a mobile terminal application) of the mobile terminal 13 uploads environmental information including orientation information, pedometer information, and sound level information at a predetermined time or at predetermined time intervals to the authentication apparatus 21.

When the uploaded location information from the mobile terminal 13 greatly differs from the currently-registered location information associated with time information corresponding to the time information of the uploaded location information, the authentication apparatus 21 tallies past location information and environmental information associated with the same usage number and the same time information.

In the example of FIG. 11, it is assumed that although the user is expected to act according to the schedule information of FIG. 8, the user is ordered to visit a company L when arriving at a company C. In this case, according to the present embodiment, when the user enters a change via the mobile terminal application, action information and environmental information after the entered change are replaced by action information and environmental information obtained from past schedule information associated with the same usage number and the same time information taking into account the probabilities of the environmental information.

In the present embodiment, even when a schedule is changed, the user can receive a desired service (e.g., travel assistance or a map tool using the GPS 87 of the mobile terminal 13). Also, the present embodiment eliminates the need for the user to enter a user ID and a password again, and enables the user to be authenticated based on action information and environmental information associated with the corresponding time information illustrated in FIG. 11 and to continuously receive a service even after the time of 08:30.

Here, different probability levels are preferably assigned to environmental information obtained from the measurement devices and to environmental information obtained from accumulated past schedule information. This makes it possible to properly perform authentication.

When a service to allow the mobile terminal 13 to read information stored in the PC 12 is to be provided, the service may be implemented by enabling the mobile terminal 13 to perform connection authentication with an application (PC application) of the PC 12 that searches information in the PC 12 and to specify information to be searched for.

<Probability Determination>

An exemplary method of determining a probability at the probability determination apparatus 23 is described below. FIG. 12A is a table illustrating an example of environmental information obtained from the measurement devices of the mobile terminal 13 at the time of 09:00 after a schedule is changed. In the non-limiting example of FIG. 12A, the environmental information includes location information (latitude/longitude), orientation information (degrees), pedometer information (steps), and sound level information (dB).

In the example of FIG. 12A, location information is registered as past information. The latitude and the longitude representing the location information can be accurately obtained from, for example, the GPS 87 of the mobile terminal 13. For this reason, the probability level of the location information at 09:00 is higher than other environmental information items.

The probability level is described. The probability level is a weight for determining the probability of an environmental information item obtained from the mobile terminal 13 based on a predefined range of environmental information. The probability level depends, for example, on a service corresponding to schedule information, the accuracy of the environmental information item, and the number of records of accumulated past data of the user.

FIG. 12B is a table illustrating and an example of probability criteria. In FIG. 12A, for example, location information on 2012/01/10 and 2012/01/20 is different from location information on 2011/11/20, 2011/12/15, and 2012/01/15. Thus, it can be easily determined that on 2012/01/10 and 2012/01/20, the mobile terminal 13 was at a location different from the location on 2011/11/20, 2011/12/15, and 2012/01/15. Therefore, the location information on 2012/01/10 and 2012/01/20 is distinguished from the location information on 2011/11/20, 2011/12/15, and 2012/01/15. Because the schedule information is more accurate than the other environmental information items, the location information and the time information are grouped. Here, because even the location information is not absolute data, it is preferable to set a tolerance (e.g., ±0.1 (degrees)) for a reference value used to determine a probability.

As a non-limiting example, when reference values of latitude and longitude are "035.45" and "139.44", the tolerable ranges of latitude and longitude may be set at "035.35-035.55" and "139.34-139.54".

The orientation information indicates a direction in which the user is headed, and the probability level of the orientation information is the second highest following the location information. In FIG. 12A, for example, the orientation information on 2011/12/15 is different from the reference value. However, when the total probability is within a predetermined range, a service defined by the information management server 11 is provided.

The value of the pedometer information varies depending on how the mobile terminal 13 is used, and the value of the sound level information also varies due to, for example, a sound that is coincidentally produced at the corresponding location. Therefore, each of the pedometer information and the sound level information cannot be used alone to determine a probability, and is preferably used as one of the factors for determining a probability. Accordingly, the probability levels of the pedometer information and the sound level information are low.

Tolerances indicating allowable deviations from the reference values may be set as indicated in FIG. 12B. In the present embodiment, authentication is performed based on a total probability that is obtained based on measurement values (environmental information items) measured by the mobile terminal 13 taking into account probability levels assigned to the respective measurement values.

For example, when measurement values are within predetermined ranges from reference values defined for respective environmental information items and a total probability obtained based on probability levels assigned to the environmental information items is within a predefined probability range, the authentication apparatus 21 determines that an action is performed by a genuine user and allows a service corresponding to action information to be provided to the user.

<Formulas>

Exemplary calculation of a probability at the time of 09:00 based on the probability criteria of FIG. 12B is described using formulas.

When reference values of the location information are A and B, measurement values of the location information are AA and BB, and a probability level (P level) of the location information is AAA, the probability of the location information may be calculated by "(|A−AA|/A×1000+|B−BB|/B×1000)×AAA". Here, A and AA indicate latitude, and B and BB indicate longitude.

When a reference value of the orientation information is C, a measurement value of the orientation information is CC, and a P level of the orientation information is CCC, the probability of the orientation information may be calculated by "|C−CC|/C×100)×CCC".

When a reference value of the pedometer information is D, a measurement value of the pedometer information is DD, and a P level of the pedometer information is DDD, the probability of the pedometer information may be calculated by "(|D−DD|/D×100)×DDD".

Similarly, when a reference value of the sound level information is E, a measurement value of the sound level information is EE, and a P level of the sound level information is EEE, the probability of the sound level information may be calculated by "(|E−EE|/E×100)×EEE".

Here, it is assumed that each of values obtained by the above formulas is less than or equal to a predetermined threshold of 100. Thus, a user of the mobile terminal 13 that has sent environmental information items whose matching degrees are within predetermined ranges is determined to be a genuine user.

Here, let us assume that the P level AAA of the location information is 100, the P level CCC of the orientation information is 10, the P level DDD of the pedometer information is 3, and the P level EEE of the sound level information is 1. It is also assumed that, as indicated by the above formulas, |A−AA|/A and |B−BB|/B of the location information are multiplied 1000, and |C−CC|/C of the orientation information, |D−DD|/D of the pedometer information, and |E−EE|/E of the sound level information are multiplied by 100 according to the precision and effective digits of the measurement values.

Based on the above assumptions, a total probability at the time of 09:00 in the case of FIG. 12B is calculated below. When, for example, the reference value A is 035.45, the measurement value AA is 035.44, the reference value B is 139.44, the measurement value BB is 139.44, and the P level AAA is 100, the probability of the location information is obtained by |035.45−035.44|/035.45×1000+|139.44−139.44|/139.44×1000=0.282×100=28.2≈28. Here, the result of the formula is rounded to express the probability of each information item by a natural number.

When the reference value C is 50.00, the measurement value CC is 55.00, and the P level CCC is 10, the probability of the orientation information is obtained by |60.00−58.00|/60.00×100=3.33×10=33.3≈33.

Similarly, when the reference value D is 2500, the measurement value DD is 2650, and the P level DDD is 3, the probability of the pedometer information is obtained by |2500−2650|/2500×100=6×3=18.

Also, when the reference value E is 80.00, the measurement value EE is 70.00, and the P level EEE is 1, the probability of the sound level information is obtained by |80.00−70.00|/80.00×00=12.5×1=12.5≈13.

Further, a total probability is obtained by adding the above calculation results, i.e., by 28+33+18+13=92. Thus, the total probability becomes less than or equal to a predetermined threshold of 100. Thus, because the environmental information items obtained by the measurement devices at the time of 09:00 are within the tolerable ranges of the reference values in FIG. 12B, the user of the mobile terminal 13 is determined to be a genuine (or authorized) user. As a result, the authentication apparatus 21 can allow the mobile terminal 13 to use a (registered) service requested by the user at 09:00.

The P levels described above are determined, for example, based on the precision of the measurement devices and the accuracy of actions of the user. For example, a high P level of 100 is assigned to the location information obtained by the GPS 87 because it can obtain an accurate location. On the other hand, a low P level of 1 is assigned to the sound level information because it greatly varies even when it is represented by an average sound level in a predetermined period of time. A medium P level of 10 is assigned to the orientation information indicating a direction of movement. A relatively-low P level of 3 is assigned to the pedometer information because the value of which depends on transportation. The P levels may be determined based on averages of environmental information items in a predetermined period of time instead of using only the environmental information items at the time of 09:00. Also in the present embodiment, the P levels may be changed based on the number or types of obtained environmental information items.

<Probability of Genuineness of User>

Next, a probability (total probability) of genuineness of a user is described. In the present embodiment, the probability indicates a probability of an action that is obtained based of, for example, accumulated past environmental information and multiple measurement values of environmental information obtained from the mobile terminal 13. Thus, the probability of the present embodiment is different from a prediction based solely on past data. A typical prediction formula used, for example, for a weather forecast is composed of a cause (a variable of an event to be explained) and an effect (a variable of a target event). For example, when there are three types of events, cause variables are represented by A, B, and C, and effect variables are represented by $\alpha$, $\beta$, and $\gamma$, a predicted value Y is obtained by a relational expression $Y=A\alpha+B\beta+C\gamma$.

In this relational expression, the probability of occurrence of the effect variables ($\alpha$, $\beta$, and $\gamma$) is obtained by multiplying the effect variables, respectively, by the cause variables (A, B, and C), and totaling the multiplication results. Also, the multiplication results may be weighted. However, in the case of the weather forecast, because only past data is used, weights of all the events are the same and as a result, only the cause variables can be derived.

In the present embodiment, the probability is obtained by weighting each cause variable obtained based on measured environmental information (location information, orientation information, pedometer information, and sound level information) and the corresponding past data. For example, in the case of the orientation information described above, the reference value C calculated based on past environmental information corresponds to an effect variable in the prediction formula. Also, the difference between the measurement value CC and the reference value C corresponds to a cause variable in the prediction formula, which indicates a probability of occurrence of an event represented by the cause variable. Accordingly, $|C-CC|/C$ in the above formula includes an effect variable and a cause variable.

Also in the present embodiment, a P level is used as a weight. Unlike the related-art prediction calculation, the P level is not the same for all environmental information items. This is because even when the measurement devices have the same measurement precision, the weights (or importance) of environmental information items vary when they are used for user authentication.

For example, when a service for providing map information at a specified location in an outdoor environment is to be provided, the highest P level is assigned to the location information, and the second highest P level is assigned to the orientation information indicating a direction of movement toward a target location. Also in this case, a low P level is assigned to the sound level information that greatly varies depending on the situation.

As another example, assume a case where the location information of the mobile terminal 13 is not accurate, the variation of the orientation information is small, and a service for displaying a company data during working hours and displaying private data after the working hours is to be provided. In this case, a low P level is assigned to the location information obtained by the GPS 87, and a high P level is assigned to environmental information indicating, for example, that the mobile terminal 13 has changed Wi-Fi access points because it is necessary to determine whether and when the mobile terminal 13 left the office. Thus, in the present embodiment, weights of environmental information items can be changed depending on services used by the user.

<Input Screens>

Figure 13:
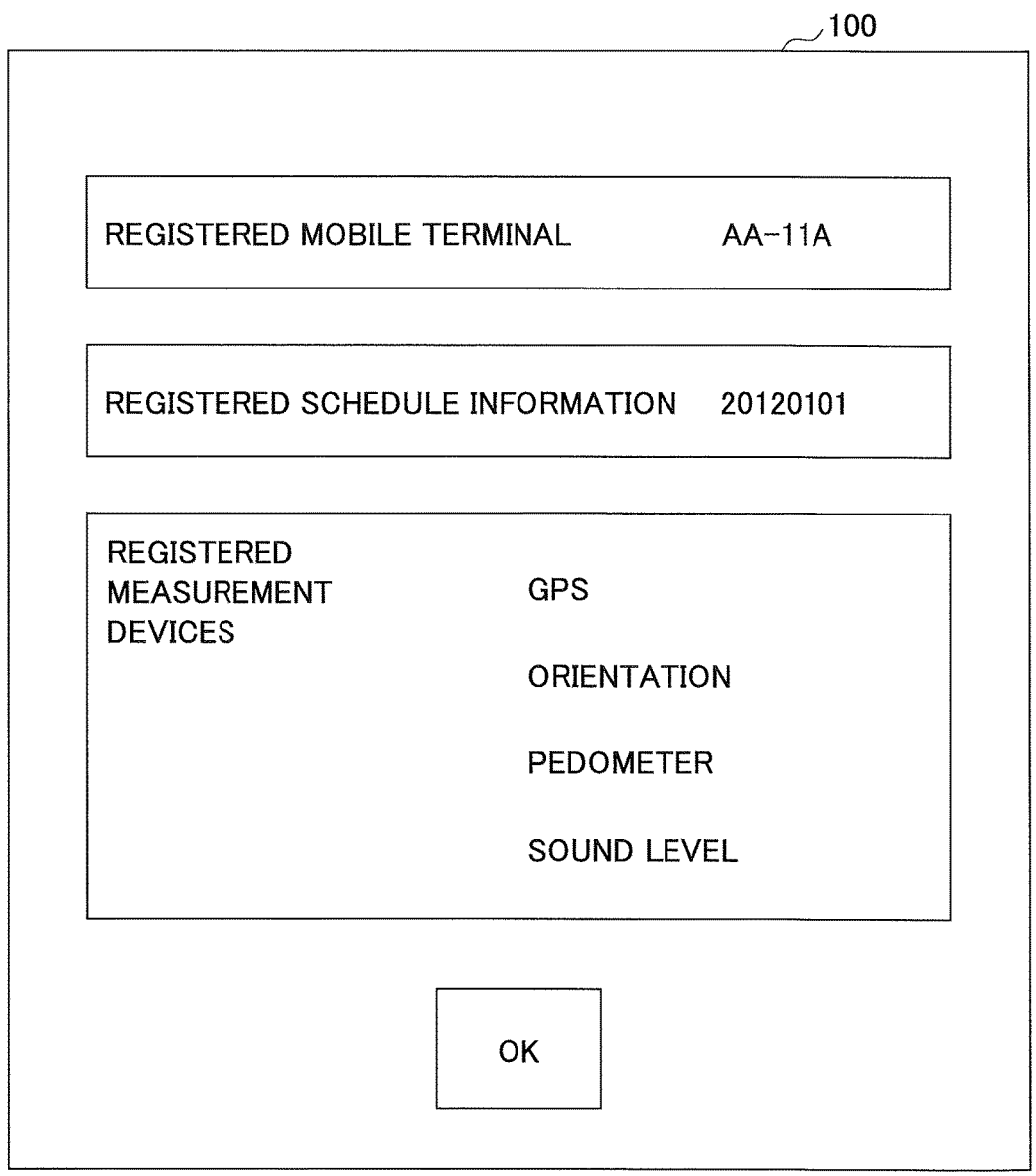
FIG. 13 is a drawing illustrating an exemplary input screen for initial registration.

Exemplary input screens of the mobile terminal 13 for initial registration of schedule information and for changing schedule information are described below. FIG. 13 is a drawing illustrating an exemplary input screen 100 for initial registration. The input screen 100 of FIG. 13 displays a model name of the mobile terminal 13 that is registered together with the PC 12 and enabled to collaborate with the PC 12. On the other hand, because the mobile terminal 13 cannot be identified with the model name, the authentication apparatus 21 manages the mobile terminal 13 using, for example, a serial number or IMEI information.

The input screen 100 also displays a file name "20120101" of schedule information registered by the PC 12. Further, the input screen 100 displays names of measurement devices included in or externally connected to the mobile terminal 13. In the example of FIG. 31, GPS, Orientation, Pedometer, and Sound Level are displayed as the names of registered measurement devices. Information displayed on the input screen 100 can be changed using the input screen 100.

Let us assume a case where schedule information is registered via the PC 12 at the home of the user, the schedule of the user is changed at the company C, and the user enters a schedule change at the company C as illustrated in FIGS. 9 and 10. Even in this case, a service can be continuously provided without performing authentication of the mobile terminal 13 again. For example, it is possible to obtain map data and company data from the PC 12, and to automatically provide information corresponding to location information to the mobile terminal 13 at a K station at the time of 09:00.

In the present embodiment, when a schedule change is entered by the user, schedule information registered in the information management server 11 is changed based on past schedule information and weights. This process is described below. In the descriptions below, it is assumed that as a result of the schedule change, the user moves from the company C to the company L as illustrated in FIG. 11.

The schedule information of the user has already been stored in the schedule DB 46 in association with the usage number. As illustrated in FIG. 9, a schedule change request is sent from the mobile terminal 13 to the authentication apparatus 21.

When the mobile terminal 13 is successfully authenticated, the authentication apparatus 21 sends the schedule change request to the schedule management apparatus 22. In response to the schedule change request, the schedule management apparatus 22 obtains past schedule information of the user from the environmental information accumulating DB 54 of the probability determination apparatus 23. The environmental information accumulating DB 54 may store averages of past environmental information obtained from the measurement devices in association with time information and action information. For example, the user sends the schedule change request via the mobile terminal 13 to the authentication apparatus 21 at 08:30 in the company C.

FIG. 14 is a drawing illustrating an exemplary change screen 110. In the example of FIG. 14, the user enters, on the change screen 110 of the mobile terminal 13, change information including a departure place, i.e., the company C where the schedule change occurred, a scheduled departure time at which the user will depart from the company C, and a destination, i.e., the company L. Also in this example, "normal" is entered as a scheduled arrival time. In this case, an average time necessary to go to the company L may be automatically obtained from the environmental information accumulating DB 54.

Also, when there is an exceptional condition (e.g., a taxi will be used for the entire route from the company C to the company L and trains are not used), the user may enter the condition as an action in the route. When such a condition is entered, the information management server 11 obtains the corresponding past information from the environmental information accumulating DB 54. When there is no other action in the route from the company C to the company L, the schedule management apparatus 22, for example, obtains past schedule information at the corresponding time from the environmental information accumulating DB 54 for every ten minutes, and adds averaged environmental information to the schedule DB 46 as illustrated in FIG. 11.

For example, when the user enters action information (the company C) using the mobile terminal 13 at 08:30, environmental information for the action information is added to the schedule DB 46. The environmental information (location information, orientation information, pedometer information, and sound level information) for the time of 08:30 at the company C is actually obtained from the measurement devices included in or externally connected to the mobile terminal 13, and is added to the schedule DB 46 without change.

After a service is started at 08:30, location information, orientation information, pedometer information, and sound information obtained by averaging past environmental information at the corresponding time are retrieved from the environmental information accumulating DB 54 for every 10 minutes (i.e., 08:40, 08:50, 09:00, and 0910), and are added to the schedule information in the schedule DB 46.

For example, for the time of 08:40, 035.41/139.41, 60.00, 2000, and 85.00 are added as environmental information to the schedule DB 46. Before the actual time reaches 08:40, the environmental information acquirer 44 of the schedule management apparatus 22 obtains environmental information from the mobile terminal 13, and the schedule management apparatus 22 performs a probability determination process using the above described formulas to perform personal authentication for the time of 08:40.

<Process Performed when Authentication Fails>

Figure 15:
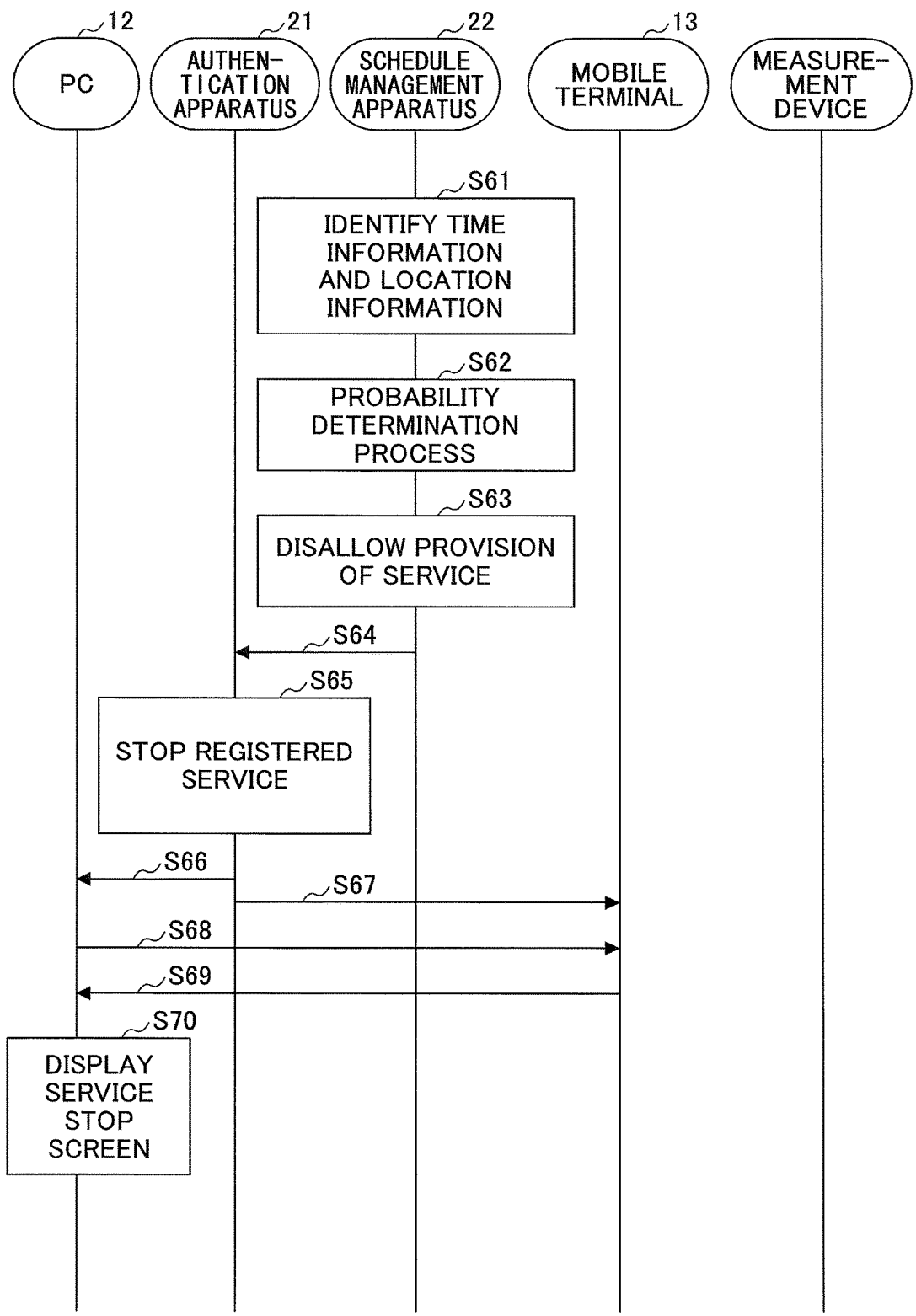
FIG. 15 is a sequence chart illustrating an exemplary process performed when authentication fails.

Next, an exemplary process performed when authentication fails is described. FIG. 15 is a sequence chart illustrating an exemplary process performed when authentication fails. Similarly to FIGS. 9 and 10, the exemplary process of FIG. 15 is described using the PC 12, the authentication apparatus 21 and the schedule management apparatus 22 of the information management server 11, the mobile terminal 13, and measurement devices of the mobile terminal 13. However, the present invention is not limited to this example.

In the example of FIG. 15, the schedule management apparatus 22 identifies time information and location information in environmental information obtained by the measurement devices and uploaded from the mobile terminal 13 (S61), and compares the uploaded environmental information with environmental information obtained from past schedule information to obtain a probability. Based on the probability, the schedule management apparatus 22 determines whether the user of the mobile terminal 13 is a genuine user (S62). Then, based on the result of step S62, the schedule management apparatus 22 determines whether to allow a service at the corresponding time to be provided to the mobile terminal 13 (S63). When it is determined that the user of the mobile terminal 13 is not a genuine user, the schedule management apparatus 22 disallows provision of the service to the mobile terminal 13 (S63). When determining to disallow the provision of the service, the schedule management apparatus 22 sends a service stop request to the authentication apparatus 21 (S64).

In response to the service stop request, the authentication apparatus 21 stops providing the registered service (S65), and sends a service stop report to the PC 12 and the mobile terminal 13 (S66, S67).

In response to the service stop report, the PC 12 sends a disconnection request to the mobile terminal 13 (S68). When a disconnection response is received from the mobile terminal 13 (S69), the PC 12 displays a screen (e.g., an error screen) indicating that the service has been stopped (S70), and terminates the process.

Figure 16:
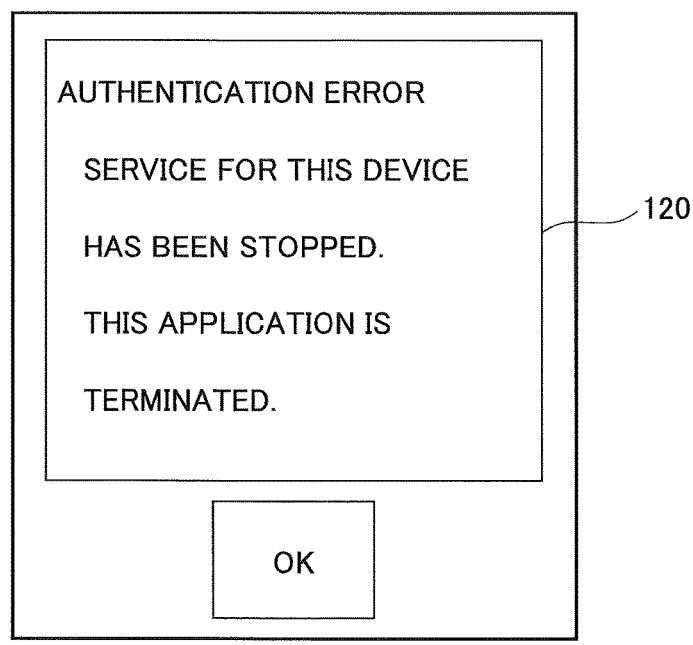
FIG. 16 is a drawing illustrating an exemplary error screen.

FIG. 16 is a drawing illustrating an exemplary error screen. For example, when the result of calculations performed using the above formulas based on environmental information obtained from the mobile terminal 13 is greater than 100, the schedule management apparatus 22 disallows the provision of the service (authentication error), and sends the service stop request. In this case, a display screen 120 as illustrated by FIG. 16 is displayed on the mobile terminal 13.

In the example of FIG. 16, the display screen 130 displays an error message "Authentication Error: Service for this device has been stopped. This application is terminated". The message in FIG. 16 is just an example, and any other message may be displayed on the display screen 120. Also, an audio message may be output from the mobile terminal 13.

For example, when the result of a probability determination process indicates that the user is not a genuine user, the schedule management apparatus 22 determines to disallow provision of a service at the corresponding time. Then, the schedule management apparatus 22 sends a service stop request to the authentication apparatus 21. In response, the authentication apparatus 21 sends a service stop report to the mobile terminal 13. As a result, a service (e.g., a cloud service) being provided by the mobile terminal 13 via the authentication apparatus 21 is stopped.

Also, when the mobile terminal 13 is receiving data from the PC 12, the service stop report is also sent to the PC 12. In response, the PC 12 sends a disconnection request to the mobile terminal 13 to disconnect the mobile terminal 13. This indicates that an action taken by the user at the time is improbable judging from past schedule information, and personal authentication of the user has failed after a service is started. This may further indicate that the mobile terminal 13 has been stolen and is being used by an impersonating user. Therefore, when personal authentication fails, the service is restarted only after the user is identified by, for example, biometric authentication at the mobile terminal 13.

As described above, according to the present embodiment, when it is determined that a user is not a genuine user, the service manager 33 of the authentication apparatus 21 can limit services available to the user.

<Applications of Present Embodiment>

Figure 17:
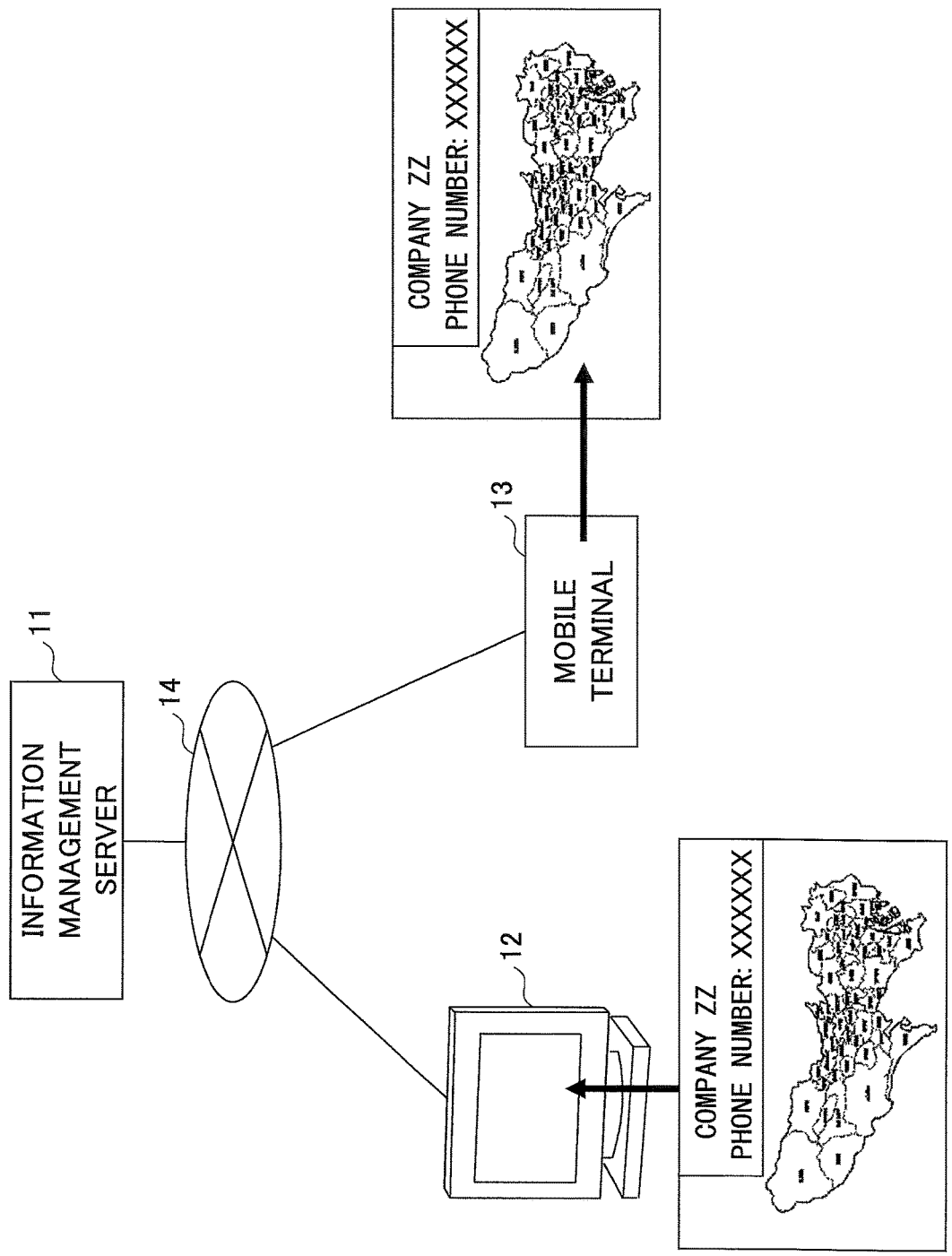
FIG. 17 is a drawing illustrating an exemplary application of an information management system.
Figure 18:
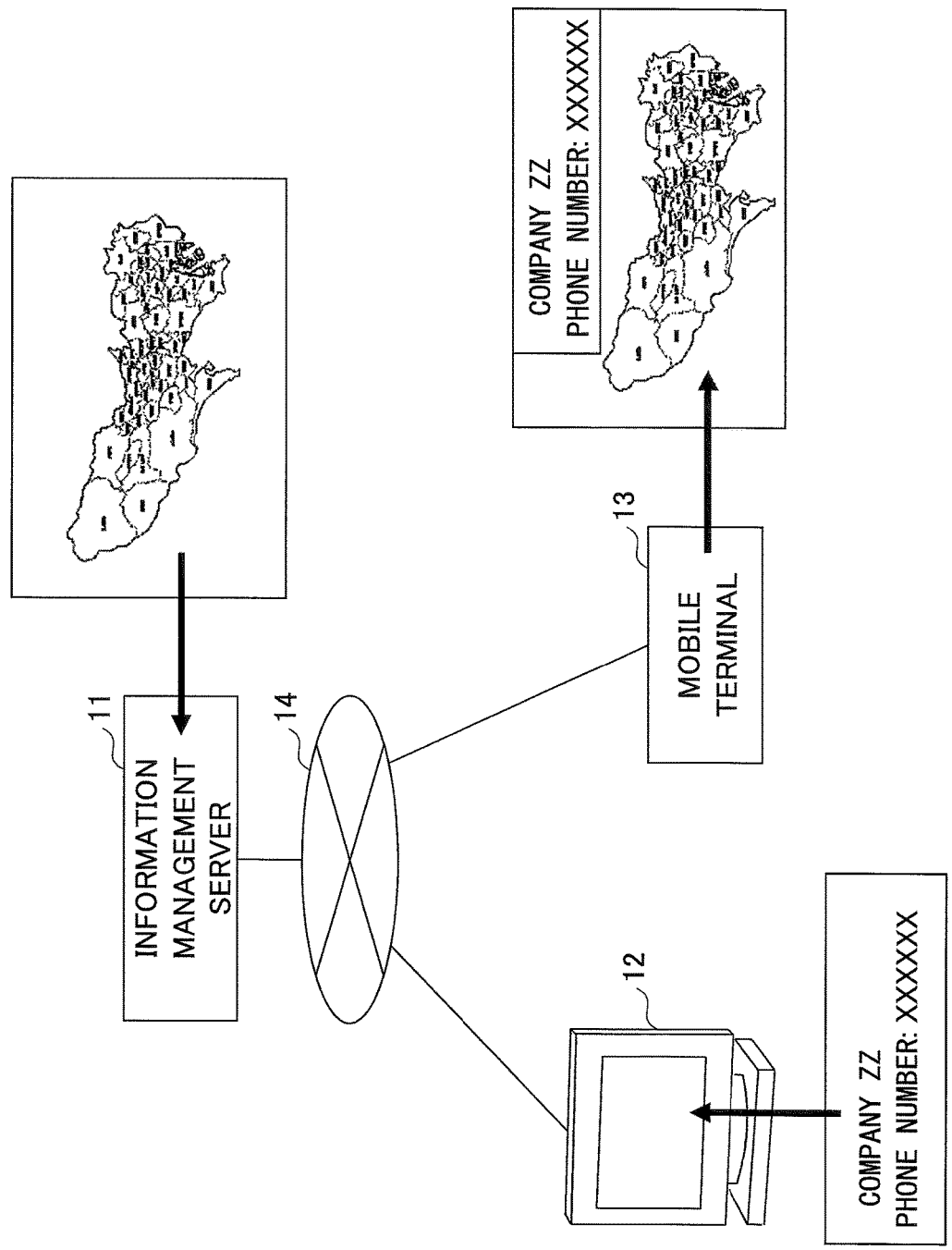
FIG. 18 is a drawing illustrating an exemplary application of an information management system.

FIGS. 17 and 18 are drawings illustrating exemplary applications of the present embodiment. In the examples of FIGS. 17 and 18, the information management server 11, the PC 12, and the mobile terminal 13 are connected via the communication network 14. The information management server 11 can send and receive data via the communication network 14 to and from the PC 12 and the mobile terminal 13.

In the example of FIG. 17, authentication is performed by the information management server 11 to allow the mobile terminal 13 to obtain map data including company information from the PC 12. When the authentication is successful, company information is obtained from the PC 12 based on location information of the mobile terminal 13 and displayed on a screen of the mobile terminal 13.

In the example of FIG. 18, the information management server 11 obtains map data corresponding to location information of the mobile terminal 13 from, for example, another cloud service, and sends the obtained map data to the mobile terminal 13. Also in the example of FIG. 18, the information management server 11 can also obtain company information stored in the PC 12 and provide the company information to the mobile terminal 13. Instead, the company information may also be obtained from a cloud service.

As exemplified by FIGS. 17 and 18, the present embodiment makes it possible to provide various services to the user by using not only information stored in the PC 12, but also information stored in the information management server 11 and information obtained from a cloud service.

As described above, the present embodiment makes it possible to reduce the burden of the user in information management. For example, according to the present embodiment, when detected schedule information is different from registered schedule information, whether the detected schedule information is within the scope of a past action is determined by referring to past schedule information; and when the detected schedule information is within the scope of the past action, the registered schedule information is automatically changed to eliminate the need for the user to enter schedule information again.

Also according to the present embodiment, schedule information including service information is registered in advance in an authentication server, and continuously-measured environmental information is sent from a mobile terminal to the authentication server at irregular time intervals. The authentication server compares the environmental information with reference information in the authentication server to determine a probability of genuineness of a user, and updates the registered schedule information associated with the corresponding time information.

Also according to the present embodiment, environmental information items obtained from measurement devices of a mobile terminal are selected based on a service to be used, a probability of genuineness of a user is determined based on probability information of the respective environmental information items, and the user is authenticated based on the probability to determine whether to allow the service to be provided to the user. Also according to the present embodiment, probability information of respective environmental information items is changed according a service to be used and an environment where the service is used so that personal authentication suitable for the service can be performed. Also according to the present embodiment, multiple environmental information items obtained from a mobile terminal are compared with environmental information items associated with the corresponding time information in past schedule information accumulated for a predetermined period of time, to determine the degrees of matching of the environmental information items, and personal authentication is performed based on the determined degrees of matching. For example, this configuration makes it possible to perform personal authentication without requiring a user to enter an ID and a password or to provide biometric information via a device connected to a mobile terminal.

Further, the present embodiment makes it possible to determine a probability of genuineness of a user based on multiple environmental information items and to provide a service according to the degree of probability. This in turn makes it possible to provide a service according to a user environment. For example, the range of available services may be limited in an outdoor environment to prevent disclosure of confidential information.

With the related-art technologies, authentication is performed based on fixed schedule information. Therefore, when the location of a user at a time is different from that in the fixed schedule information, the user needs to enter an ID and a password or provide biometric information to be authenticated. The present embodiment solves this problem and eliminates the need for the user to enter authentication information again. Further, the present embodiment makes it possible to prevent impersonation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information management apparatus, comprising:
a memory; and
a processor configured to execute a process including
registering schedule information including action information indicating a destination of a user, time information associated with the action information, and location information indicating a geographical location of the destination,
storing the registered schedule information in the memory, obtaining, from a mobile terminal of the user, current environmental information including location information indicating a geographical location of the mobile terminal, and when the registered schedule information is changed, comparing the location information in the current environmental information with a tolerable range of location information to obtain a value indicating a probability that the user is the genuine user, the tolerable range of location information being determined based on a reference value that is obtained based on location information included in past environmental information obtained from past schedule information stored in the memory, and determining whether the user is the genuine user based on the obtained value.

2. The information management apparatus as claimed in claim 1, wherein the processor is further configured to change the registered schedule information when it is determined that the user is the genuine user.

3. The information management apparatus as claimed in claim 2, wherein the processor is further configured to limit a service available to the user according to the registered schedule information when it is determined that the user is not the genuine user.

4. A method performed by an information management apparatus, the method comprising:

registering schedule information including action information indicating a destination of a user, time information associated with the action information, and location information indicating a geographical location of the destination;

storing the registered schedule information in a memory;

obtaining, from a mobile terminal of the user, current environmental information including location information indicating a geographical location of the mobile terminal; and when the registered schedule information is changed, comparing the location information in the current environmental information with a tolerable range of location information to obtain a value indicating a probability that the user is the genuine user, the tolerable range of location information being determined based on a reference value that is obtained based on location information included in past environmental information obtained from past schedule information stored in the memory, and determining whether the user is the genuine user based on the obtained value.

5. A non-transitory computer-readable storage medium storing a program for causing a computer to execute a process, the process comprising:

registering schedule information including action information indicating a destination of a user, time information associated with the action information, and location information indicating a geographical location of the destination;

storing the registered schedule information in a memory;

obtaining, from a mobile terminal of the user, current environmental information including location information indicating a geographical location of the mobile terminal; and when the registered schedule information is changed, comparing the location information in the current environmental information with a tolerable range of location information to obtain a value indicating a probability that the user is the genuine user, the tolerable range of location information being determined based on a reference value that is obtained based on location information included in past environmental information obtained from past schedule information stored in the memory, and determining whether the user is the genuine user based on the obtained value.

* * * * *